US012439885B2

(12) United States Patent
Smith et al.

(10) Patent No.: US 12,439,885 B2
(45) Date of Patent: Oct. 14, 2025

(54) LITTER DEVICE WITH BEZEL ASSEMBLY

(71) Applicant: Automated Pet Care Products, LLC, Auburn Hills, MI (US)

(72) Inventors: Jason Smith, West Bloomfield, MI (US); Brad Baxter, Bloomfield Hills, MI (US)

(73) Assignee: Automated Pet Care Products, LLC, Auburn Hills, MI (US)

( * ) Notice: Subject to any disclaimer, the term of this patent is extended or adjusted under 35 U.S.C. 154(b) by 240 days.

(21) Appl. No.: 18/249,884

(22) PCT Filed: Oct. 25, 2021

(86) PCT No.: PCT/US2021/056491
§ 371 (c)(1),
(2) Date: Apr. 20, 2023

(87) PCT Pub. No.: WO2022/087531
PCT Pub. Date: Apr. 28, 2022

(65) Prior Publication Data
US 2023/0380378 A1    Nov. 30, 2023

Related U.S. Application Data

(60) Provisional application No. 63/104,604, filed on Oct. 23, 2020, provisional application No. 63/104,625, (Continued)

(51) Int. Cl.
*A01K 1/01*    (2006.01)
(52) U.S. Cl.
CPC .................. *A01K 1/0114* (2013.01)

(58) Field of Classification Search
CPC ............................ A01K 1/0114; A01K 1/011
See application file for complete search history.

(56) References Cited

U.S. PATENT DOCUMENTS 4,096,827 A    6/1978 Cotter
4,120,264 A    10/1978 Carter
(Continued)

FOREIGN PATENT DOCUMENTS

CN    209314546 U    8/2019
CN    209518062 U    10/2019
(Continued)

OTHER PUBLICATIONS

Aimicat available at https://aimicat.com/. As accessed on Sep. 9, 2020.
(Continued)

*Primary Examiner* — Kimberly S Berona
*Assistant Examiner* — Nevena Aleksic
(74) *Attorney, Agent, or Firm* — The Dobrusin Law Firm, P.C.; Daniela M. Thompson-Walters

(57) ABSTRACT

A bezel assembly comprising: a) a bezel configured for encircling an entry opening of a litter device; and b) one or more accessories removably affixed thereon. A litter device having: a) a base; b) a chamber with an entry opening, wherein the chamber is configured to retain litter and is supported by the base; c) a bezel located about the entry opening; and d) one or more accessories removably affixed to the bezel.

23 Claims, 19 Drawing Sheets

Related U.S. Application Data filed on Oct. 23, 2020, provisional application No. 63/104,574, filed on Oct. 23, 2020.

(56) References Cited

U.S. PATENT DOCUMENTS

| | | | |
|---|---|---|---|
| 4,729,342 A | 3/1988 | Loctin | |
| 4,886,014 A | 12/1989 | Sheriff | |
| 5,048,464 A | 9/1991 | Shirley | |
| 5,107,797 A | 4/1992 | LaRoche | |
| 5,458,090 A | 10/1995 | Favreau | |
| 5,477,812 A | 12/1995 | Walters | |
| 5,509,379 A | 4/1996 | Hoeschen | |
| 5,551,375 A | 9/1996 | Flores | |
| 5,622,140 A | 4/1997 | McIlnay-Moe | |
| 5,662,066 A | 9/1997 | Reitz | |
| 5,752,465 A | 5/1998 | Page | |
| 5,782,206 A | 7/1998 | Markowitz | |
| 6,055,935 A | 5/2000 | Engel | |
| 6,082,302 A | 7/2000 | Thaler et al. | |
| 6,126,015 A * | 10/2000 | Haymaker | B07B 1/28 209/362 |
| 6,463,881 B2 | 10/2002 | Reitz | |
| 6,851,386 B2 | 2/2005 | Northrop et al. | |
| 7,137,355 B1 | 11/2006 | Wan | |
| 7,198,006 B2 | 4/2007 | Fischer | |
| 7,278,372 B2 | 10/2007 | Colsky | |
| 7,487,742 B2 | 2/2009 | Waters | |
| 7,647,889 B2 | 1/2010 | Horanoff | |
| 7,762,231 B2 | 7/2010 | Dugas et al. | |
| 7,798,101 B2 | 9/2010 | Waters | |
| 8,091,734 B2 | 1/2012 | Furner | |
| 8,413,608 B2 | 4/2013 | Sharp et al. | |
| 8,475,367 B1 | 7/2013 | Yuen et al. | |
| 8,485,131 B2 | 7/2013 | Veness | |
| 8,544,418 B2 | 10/2013 | Jiang et al. | |
| 8,757,094 B2 | 6/2014 | Baxter | |
| 9,433,185 B2 | 9/2016 | Baxter | |
| 9,504,228 B1 | 11/2016 | Egor et al. | |
| 9,565,830 B1 | 2/2017 | Caico | |
| 9,820,315 B2 | 11/2017 | Le Guen | |
| 10,098,315 B2 | 10/2018 | Couto | |
| 10,321,659 B1 | 6/2019 | Turner | |
| 10,467,879 B2 | 11/2019 | Stefanski | |
| 11,076,577 B1 | 8/2021 | Rotman | |
| 2002/0139312 A1 | 10/2002 | Reitz | |
| 2006/0196438 A1 | 9/2006 | Caputa et al. | |
| 2007/0227457 A1 | 10/2007 | Waters | |
| 2008/0017123 A1 | 1/2008 | Chin | |
| 2011/0303156 A1 | 12/2011 | Sikka et al. | |
| 2013/0033625 A1 | 2/2013 | Kato | |
| 2013/0206075 A1 | 8/2013 | Huck | |
| 2013/0333625 A1 | 12/2013 | Baxter | |
| 2014/0060441 A1 | 3/2014 | Baxter | |
| 2014/0349061 A1 | 11/2014 | Sikka et al. | |
| 2016/0170389 A1 | 6/2016 | Im | |
| 2016/0294630 A1 | 10/2016 | Verma | |
| 2017/0244574 A1 | 8/2017 | Moon | |
| 2018/0322405 A1 | 11/2018 | Fadell | |
| 2019/0132396 A1 | 5/2019 | Finnegan | |
| 2019/0364840 A1 | 12/2019 | Baxter et al. | |
| 2020/0060221 A1 | 2/2020 | Fan et al. | |
| 2020/0112453 A1 | 4/2020 | Brown | |
| 2021/0007320 A1 | 1/2021 | Wu | |
| 2022/0125006 A1 | 4/2022 | Smith | |

FOREIGN PATENT DOCUMENTS

| | | |
|---|---|---|
| CN | 209711057 U | 12/2019 |
| CN | 209732234 U | 12/2019 |
| CN | 211020441 U | 7/2020 |
| CN | 109463289 A | 7/2021 |
| EP | 1625788 A1 | 2/2006 |
| EP | 2676543 B1 | 12/2018 |
| FR | 2687285 A1 | 8/1993 |
| FR | 3070822 A1 | 3/2019 |
| GB | 2114648 A | 8/1983 |
| WO | 1998/001374 A2 | 1/1998 |
| WO | 2002/054860 A1 | 7/2002 |
| WO | 2016/190765 A1 | 12/2016 |
| WO | 2020/043005 A1 | 3/2020 |
| WO | 2020/219849 A1 | 10/2020 |
| WO | 2022/087530 A1 | 4/2022 |

OTHER PUBLICATIONS

Catgloo available at http://pethealthintec.com/. As accessed on Sep. 9, 2020.
Catlink available at https://en.xiaomitoday.it/catlink-automatic-litter-box-youth.html. As accessed on Sep. 9, 2020.
Circle Zero available at https://plutocirclezero.com/. As accessed on Sep. 9, 2020.
Igloo available at https://www.indiegogo.com/projects/igloo-reinvent-affordable-auto-cat-litter-box#/. As accessed on Sep. 9, 2020.
Meet available at https://www.slashpets.com/robotic-cat-litter-box/. As accessed on Sep. 9, 2020.
Petato Footloose available at https://www.kickstarter.com/projects/petato/footloose-next-gen-automatic-and-health-tracking-c. As accessed on Sep. 9, 2020.
Petree available at https://petreelitterboxes.com/. As accessed on Sep. 9, 2020.
Notification of Transmittal of International Search Report and Written Opinion, dated May 24, 2022, Application No. PCT/US2021/056491.
IPRP, dated Jan. 25, 2023, Application No. PCT/US2021/056491.
Chinese Notification of First Office Action and Search Report dated Jul. 29, 2025, Application No. 202180079957.8.

* cited by examiner

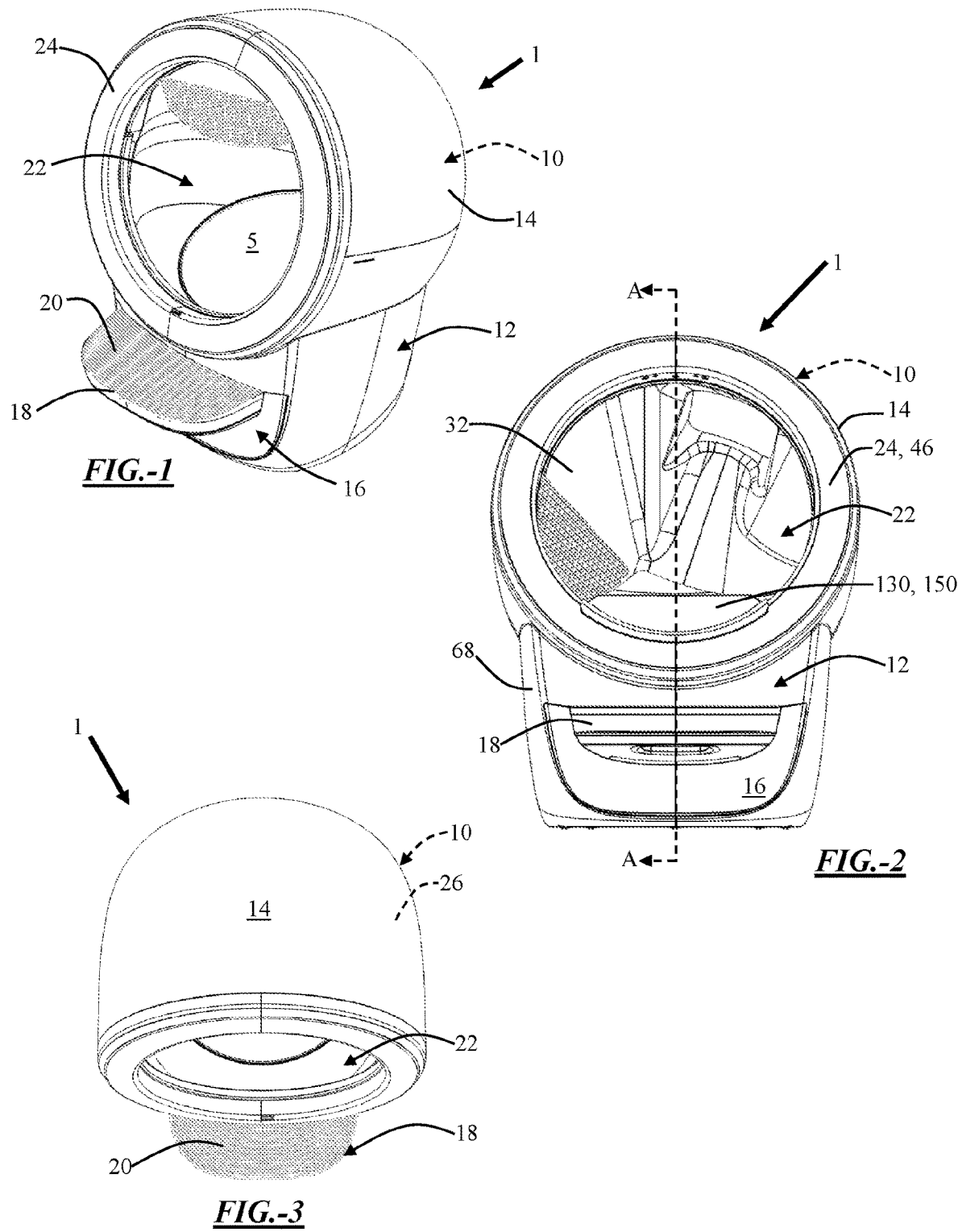

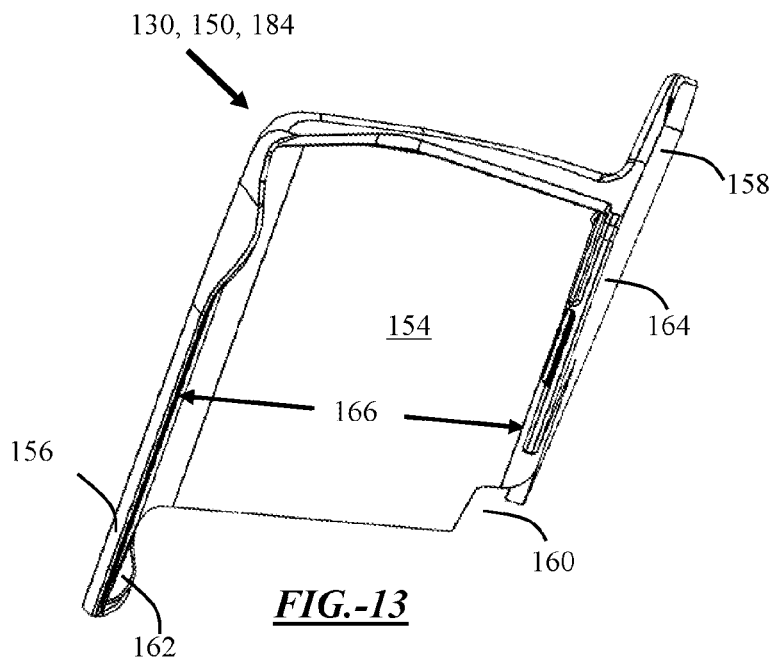
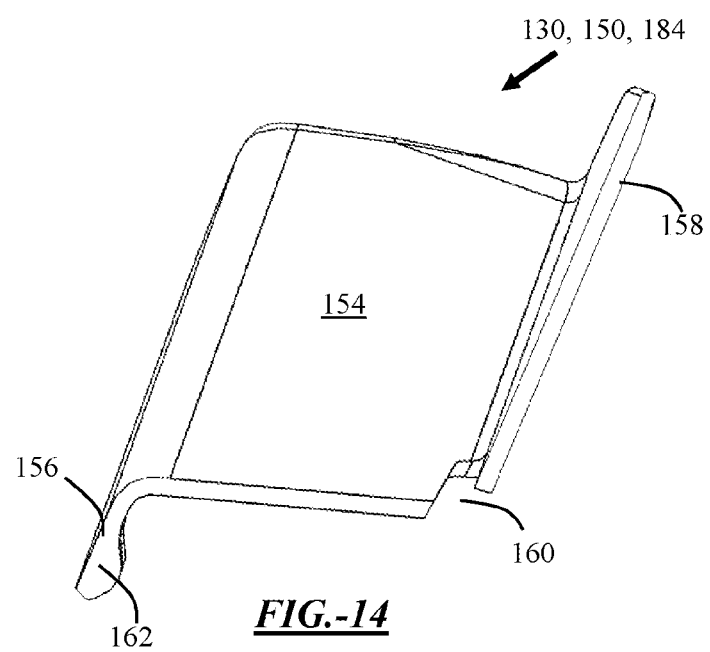

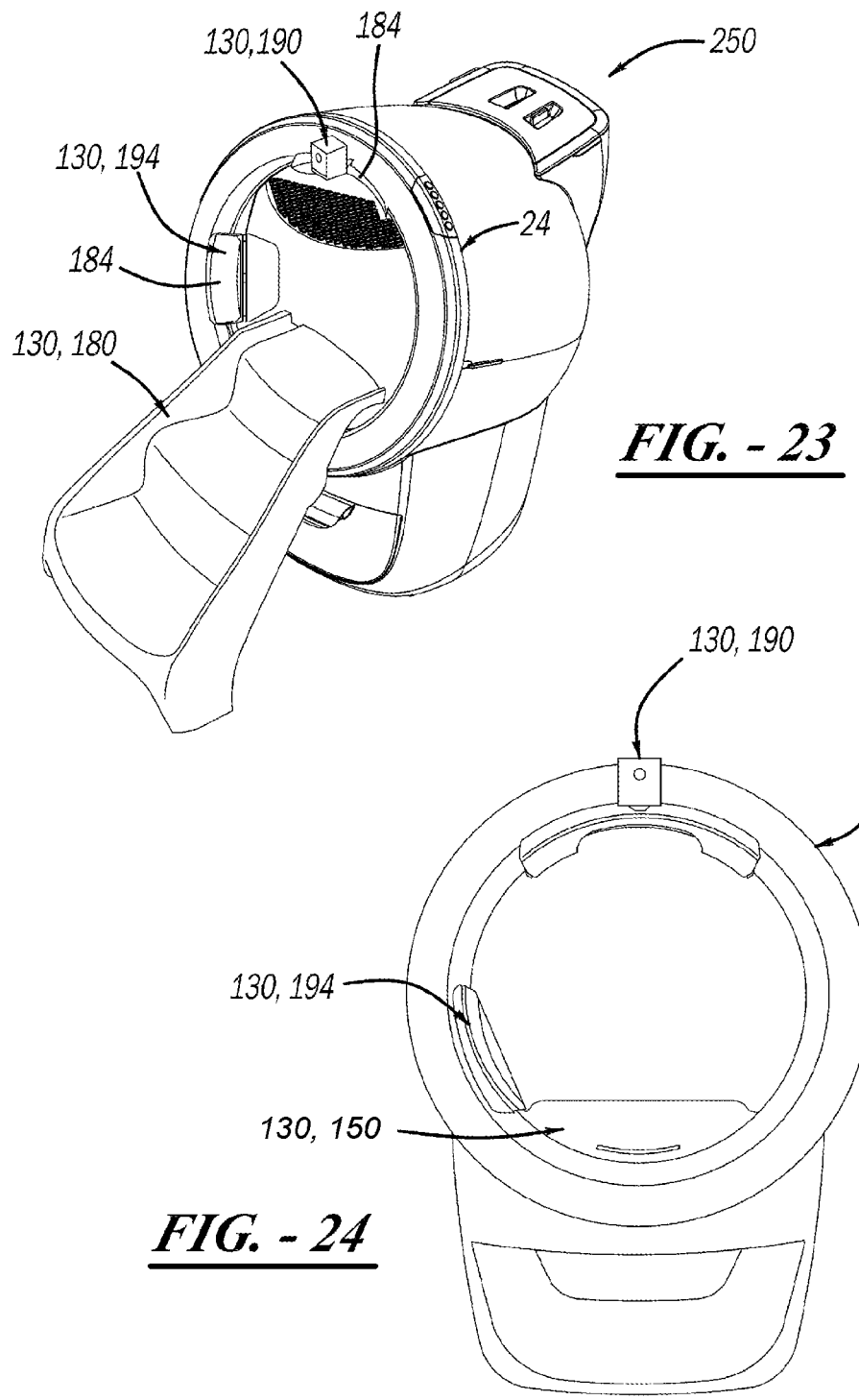

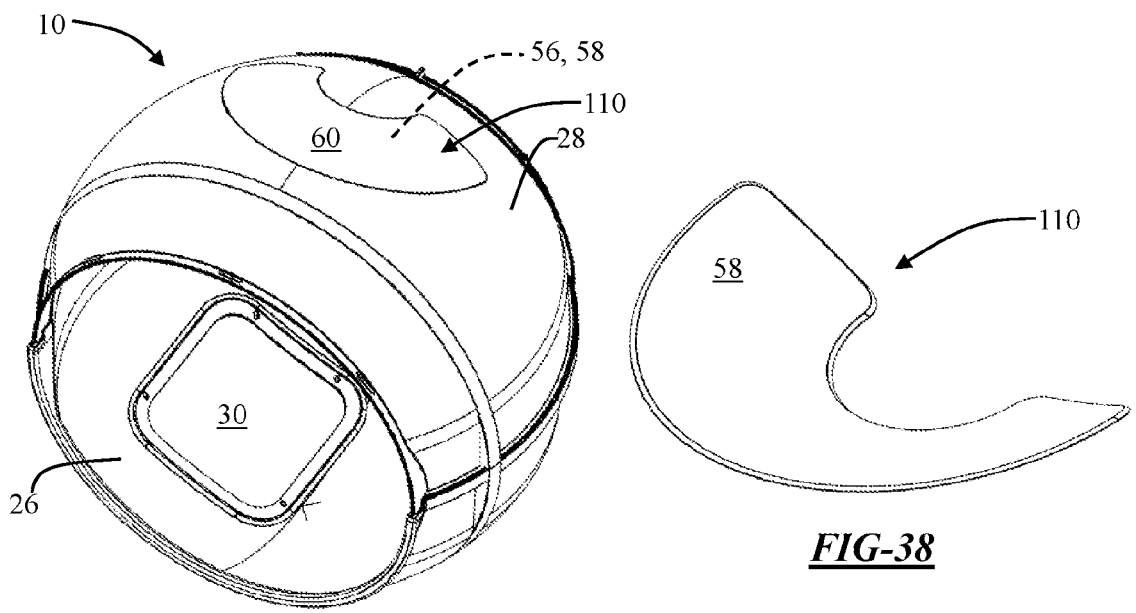
*FIG.-37*
*FIG.-38*
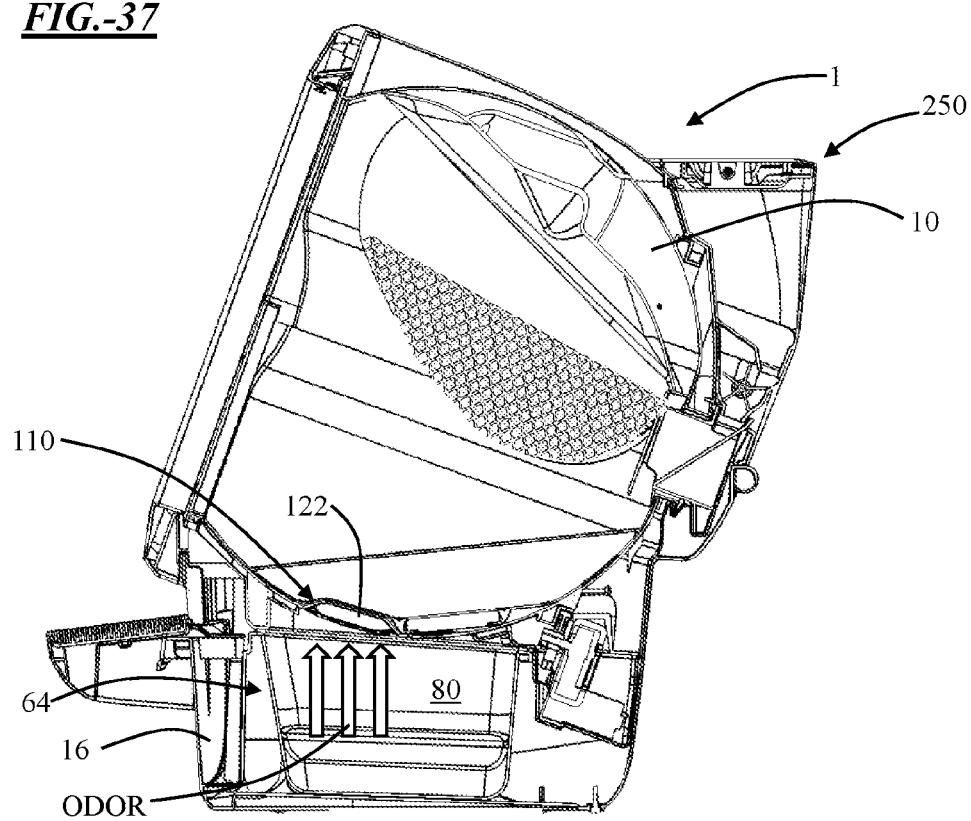
*FIG.-39*

LITTER DEVICE WITH BEZEL ASSEMBLY

CROSS-REFERENCE TO RELATED APPLICATIONS

This application claims priority from U.S. Provisional Application Nos. 63/104,574, 63/104,604, and 63/104,625, each filed on Oct. 23, 2020, and which are incorporated herein by reference in their entirety for all purposes.

FIELD

The present teachings generally relate to a litter device for use by animals which automatically removes animal waste from litter. The present teachings may be particularly useful in providing one or more easily removable accessories which cooperate with the litter device and aid in the animal being attracted to and continuously using the litter device. The present teachings may also be beneficial in aiding in the reduction and control of malodors which may emanate from a litter device once used by an animal for eliminating waste.

BACKGROUND

Automated litter devices may provide a means for pet owners (e.g., user) to effectively manage waste eliminated by one or more of their pets. These automated litter devices may be advantageous in automatically removing waste contents from litter; automatically collecting waste for subsequent disposal; storing waste contents separate from a litter chamber such that they are not exposed to the ambient environment, thereby preventing and/or reducing smell from the waste. Examples of some automated litter boxes which may be particularly beneficial may be found in U.S. Pat. Nos. 6,463,881; 8,757,094; and 9,433,185; US Publication No: 2019/0364840; PCT Patent Application No.: PCT/US2020/029776 (published as PCT Publication No. WO 2020/219849A1); and U.S. Provisional Application Nos. 63/104,574, 63/104,604, and 63/104,625 which are incorporated by reference herein in their entirety for all purposes and can be modified to include any of the featured described herein.

A challenge with litter boxes is that domestic animals may tend to collect litter, waste, and/or other debris on their paws, in their fur, and even push or scratch litter out of the litter box. For example, cats may have the tendency to dig and bury their waste after elimination. The digging motion may push litter and other debris outside of the litter box, may trap litter in the paws of the cat, or both. While automatic litter boxes may provide an excellent means of cleaning waste eliminated from the litter box, there is still a need for addressing an animal's behavior to aid in keeping litter, waste, and debris contained within the litter device and not being tracked around a consumer's home.

A problem with litter boxes is that some domestic animals may struggle to enter an interior to use the litter box. Animals who struggle to enter the interior may be discouraged from or even refuse to use the litter box. These animals may be smaller, elderly, or otherwise have limited mobility. The animal may struggle to jump into the interior or an intermediate step, stretch toward the interior, step out of and down from an interior, or any combination thereof. For example, a small kitten may not yet be tall enough to jump into a chamber or onto an intermediate step. As another example, an elderly cat may have arthritis which prevents the cat from stretching and stepping into a chamber of a litter box.

Another challenge associated with domestic animals and their use of a litter box is that some animals may not be fully within the confines of the litter box prior to waste elimination. This may result in urine being sprayed outside of the litter box or fecal matter being deposited outside of the litter box. There is a need for enticing an animal to fully enter a litter device such that any eliminated waste is within the confines of the litter device.

A subsequent challenge associated with domestic animals is the desire for an animal to groom before and/or after eliminating waste. Animals may exit a litter device and seek fabrics within a consumer's home to stretch, scratch their body, rub their face, scratch their claws, and the like. This type of behavior may result in the domestic animal ruining a consumer's furnishings. What is needed is a litter device which is able to attract some of this natural behavior prior to or after an animal eliminating waste and thus eliminate some of the behavior in other portions of consumer's home.

A typical concern with household pets and litter boxes is the management of odors and bacteria that may accumulate near a litter box. Pet owners tend to use air fresheners, place the litter boxes in portions of a home which are infrequently used, and may be required to frequently manually change the litter. There is a need for providing odor and bacteria control in a litter device.

What is needed is a means for maintaining litter, waste, and debris in a litter device. What is needed is a means for grooming an animal with a litter device. What is needed is a means for attracting an animal to fully enter a litter box before eliminating waste. What is needed is a means for appealing an animal to use the litter device to address natural grooming behaviors. What is needed is a litter device which may easily combine multiple features for addressing a domestic animal's behavior. What is needed is a litter device which allows for one or more accessories to be removably affixed thereon. What is needed is a system which is easily configurable for different animal and household needs.

SUMMARY

The present teachings relate to a bezel assembly comprising: a) a bezel configured for encircling an entry opening of a litter device; and b) one or more accessories removably affixed thereon.

The present teachings relate to a litter device having: a) a base; b) a chamber with an entry opening, wherein the chamber is configured to retain litter and is supported by the base; c) a bezel located about the entry opening; and d) one or more accessories removably affixed to the bezel.

A litter device having: a) a base; b) a chamber with an entry opening configured for retaining a litter and supported by the base; and c) a filtering system configured for reducing, eliminating, and/or preventing malodors, litter particles, and/or waste particles.

The present teachings relate to a litter device having: a) a base; b) a chamber with an entry opening, wherein the chamber is configured to retain litter and is supported by the base; c) a bezel located about the entry opening; d) one or more accessories removably affixed to the bezel; and e) a filtering system configured for reducing, eliminating, and/or preventing malodors, litter particles, and/or waste particles.

The litter device may include one or more of the following features in any combination: the entry opening may have a cross-section which is substantially circular, ovular, elliptical, square, rectangular, the like, or any combination thereof; the bezel may have a shape which is substantially similar to and/or reciprocal with the shape of the entry opening; the bezel may have a shape which is substantially annular; the one or more accessories may include one or more litter guards, grooming portions, step aids, camera assemblies, scratch aids, enticement accessories, odor neutralizing systems, the like, or any combination thereof; the one or more accessories may include a mounting bracket; the mounting bracket may have a shape which is at least partially reciprocal with a shape of the bezel; the mounting bracket and the bezel each may include one or more mating features; the one or more mating features of the mounting bracket may engage with the one or more mating features of the bezel such that the mounting bracket is removably affixed to the bezel; the one or more mating features of the bezel may include a groove; the groove may encircle about the entry opening; the groove may be adjacent to an inner periphery and/or inner flange of the bezel; the one or more mating features of the mounting bracket may include one or more retention tabs; the mounting bracket may include a base member configured to rest upon an inner peripheral surface of the bezel; the inner peripheral surface of the bezel may be an inner flange of the bezel; the mounting bracket may include one or more front flanges; the one or more front flanges may be integral with and project from the base member; the one or more front flanges may abut with a front surface of a bezel; the one or more front flanges may include one or more scratching portions thereon; the mounting bracket may include one or more rear flanges; the one or more rear flanges may be integral with and project from the base member; the one or more rear flanges may abut with one or more flanges of a bezel; the one or more rear flanges may abut with an edge of an inner flange of a bezel; the mounting bracket may include one or more walls; the one or more walls are integral with and project from the base member; the one or more walls may project in a generally opposite direction from the base member as one or more flanges (e.g., one or more front flanges, rear flanges); the one or more walls may include one or more rear walls, hinge walls, or both; one or more walls may be continuous with one or more flanges; one or more rear walls may be continuous with one or more rear flanges; one or more hinge walls may be located between one or more front flanges and one or more rear walls; the mounting bracket may include one or more through openings; one or more through openings may pass through one or more base members, flanges, walls, or any combination thereof; one or more through openings may be formed between and in a base member and a rear wall; the mounting bracket may include one or more hinges; one or more hinges may be at least partially located between two or more walls of the mounting bracket; the one or more hinges may be affixed to and/or part of at least one of the one or more accessories; at least part of the at least one of the one or more accessories may be rotatable about a portion of the hinge, mounting bracket, or both; the one or more accessories may include one or more step aids; the one or more step aids may include a ramped portion which may include a plurality of steps, a ramp, or both; the one or more ramped portions of a step aid may be affixed to a hinge of the step aid and may be rotatable about a portion of the hinge, a mounting bracket, a bezel, or a combination thereof; the mounting bracket may have an interference fit, snap fit, or both with the bezel; the one or more accessories may include one or more grooming portions; one or more grooming portions may be affixed to one or more mounting brackets; the one or more grooming portions are affixed to one or more walls of one or more mounting brackets; the one or more grooming portions may include one or more teeth, spikes, bristles, fur attracting material, the like, or any combination thereof; the litter device may include a waste drawer; the waste drawer is located in the base and under the chamber; the litter device may include one or more sensors located adjacent to the entry opening and which may be adapted to sense a presence of an animal within the chamber, a presence of a waste in a waste bin in the base, a level of the litter in the chamber, a position of the chamber relative to the base, or any combination thereof; the one or more sensors may be located on an upper portion of the bezel such as to may have a line of sight into the chamber; at least one of the one or more sensors may have a line of sight into the waste drawer via a waste opening of the chamber; the at least one of the one or more sensors may have a line of sight into the waste drawer via the waste opening when the chamber rotates such that the waste opening is aligned with the waste drawer; the litter device may include one or more mass sensors configured to sense a mass of at least a portion of the litter device; the one or more mass sensors are affixed to and/or part of one or more feet of the base, the lift, or both; the filtering system may be an active system, passive system, or a combination of both; the filtering system may include one or more physical filters; the one or more physical filters may include one or more pre-filters, allergen filters, deodorization filters, pathogen filters, the like, or a combination thereof; the one or more physical filters may be a plurality of physical filters; the filtering system may include a ventilation system configured to move air from the litter device, about the litter device, or both; the ventilation system may be configured to move air through one or more physical filters; the ventilation system may include one or more fans, one or more air pumps, or both configured to move the air; the filtering system may be located between the chamber and the base, in an exterior storage unit, a bezel, or any combination thereof; the filtering system may be affixed to an exterior storage unit; the filtering system may be affixed to the chamber, the base, a bezel, or a combination thereof; the exterior storage unit may have the litter device located therein; the exterior storage unit may include one or more vents, one or more physical filters, and one or more ventilation systems; the exterior storage unit may be configured to be self-ventilating; the filtering system may be located generally opposite a waste opening of the chamber; a physical filter may have a shape substantially reciprocal with at least a portion of the chamber; the filtering system may be affixed to the base and located outside of the base; a ventilation system may be connected to the base by one or more ducts to provide an outflow where air from within the base is moved to an exterior of the chamber and the base; the ventilation system may not recirculate the air into the automated litter device (e.g., the one or more ducts are exhausted to an exterior environment); the one or more ducts may provide an inflow so that air passing through the ventilation system is moved from the exterior back into the base; the one or more ducts may be connected to the base via one or more ports of the base; the filtering system may include one or more of a light treatment device, thermoelectric device, physical filter, the like, or a combination thereof.

The present teachings may provide for one or more accessories compatible with a bezel of a litter device for forming a bezel assembly. The one or more accessories may be compatible with a mounting bracket which may function as a universal mounting bracket. The mounting bracket may allow for a number of accessories to be mounted onto the same structure, such as a bezel without having to customize each accessory's attachment method. One or more accessories, such as a litter guard, while removably affixed to a bezel may maintain litter, waste, and debris within a litter device.

One or more accessories may include one or more grooming portions, scratch aids, or both which may groom an animal. One or more accessories, such as one or more litter guards, enticement aids, or both may attract and/or maintain an animal fully within the chamber during waste elimination. One or more accessories may attract an animal's natural grooming behavior and divert such behavior to the litter device. One or more accessories may be compatible with one or more other accessories such that a litter device may be customized and/or configured for a consumer and their pet's needs. One or more accessories may be removably affixed to a bezel via one or more mounting brackets. One or more mounting brackets may provide for a universal mounting feature such that the mounting bracket can be removably affixed to any portion of a bezel allowing for custom placement of the one or more accessories.

BRIEF DESCRIPTION OF DRAWINGS

FIG. 1 is a perspective view of a litter device.
FIG. 2 is a front view of a litter device.
FIG. 3 is a top view of a litter device.
FIG. 13 is a right side view of an accessory for a litter device.
FIG. 14 is a cross-section view of an accessory taken section C-C of FIG. 10.
FIG. 23 is a perspective view of a litter device.
FIG. 24 is a perspective view of a litter device.
FIG. 37 illustrates a perspective view of a chamber of a litter device.
FIG. 38 illustrates a passive filter system.
FIG. 39 illustrates a litter device with a passive filter system.

DETAILED DESCRIPTION

Figure 4:
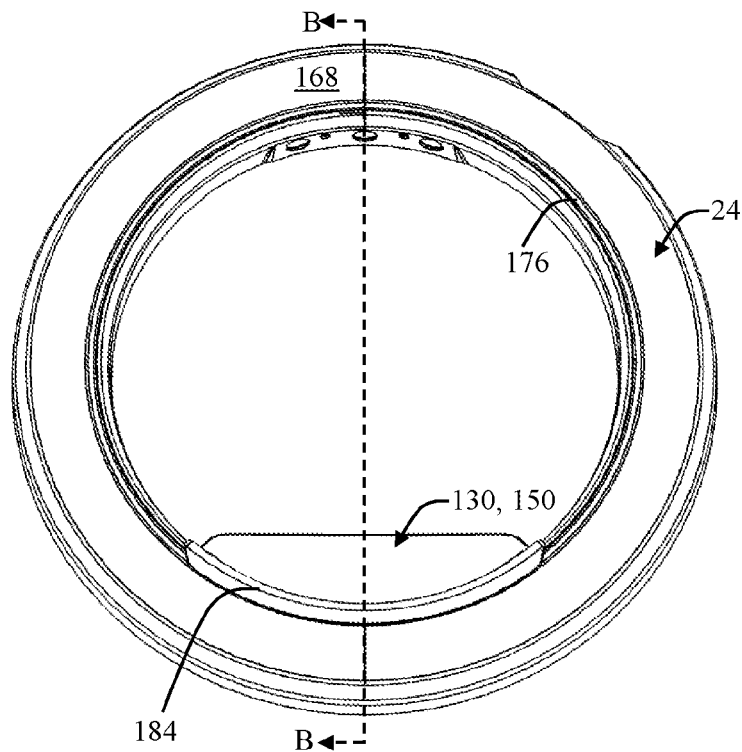
FIG. 4 is a front view of a bezel and accessory of a litter device.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Litter Device

The present teachings relate to a device that includes litter for use by an animal. The device may be a litter device. The litter device may be an automated litter device. The device may function to retain litter, sort used litter from unused litter, collect animal waste, remove animal waste, divide animal waste from litter, temporarily store animal waste, or any combination thereof. The device may have the ability to replace used litter with unused litter. The device may be useful by one or more domesticated animals. One or more domesticated animals may include one or more cats, rabbits, ferrets, pigs, dogs, ducks, goats, foxes, the like, or any combination thereof. The device may be compatible with one or more types of litter. One or more types of litter may include clumping clay, non-clumping clay, silica gel crystals, recycled paper, pine, corn wheat, walnut shells, the like, or any combination thereof. The litter device may include a base, chamber, bonnet, waste drawer, bezel, one or more accessories, one or more sensors, filtering system, storage unit, the like, or any combination thereof.

The litter device includes a chamber. The chamber may function to house clean litter, provide a space for an animal to enter and excrete waste, or both. The chamber may have any size and shape which is able to retain sufficient litter for an animal to use during waste elimination, allow for an animal to comfortably use the litter box, or both. The chamber may have a three-dimensional shape which is substantially spherical, ovoidal, cylindrical, cuboidal, conical, pyramidical, the like, or any combination thereof. A shape which is substantially spherical, ovoidal, cylindrical, and/or the like may be beneficial in providing for rotation of the chamber during a cleaning cycle, avoiding litter and/or waste from collecting along one or more vertices, or a combination thereof. For example, the chamber may be shaped like a globe, sphere, football, egg, the like, or a combination thereof. The chamber may be configured to retain litter. The chamber may be supported by a base. The chamber may be capable of rotation during a cleaning cycle. The chamber may be rotatably supported by a base. The base may be located between the chamber and a surface upon which the litter device rests. The chamber may have a generally hollow interior to accommodate one or more septums, liners, litter, and the like. The chamber may include an entry opening, waste opening, or both. The chamber may have a generally hollow interior to accommodate one or more animals during use. The chamber may have a size which is able to accommodate one or more animals which are about 1 kg or greater, about 2 kg or greater, about 4 kg or greater, about 8 kg or greater, or even about 10 kg or greater. The chamber may have a size which is able to accommodate one or more animals which are about 30 kg or less, about 25 kg or less, about 20 kg or less, or even about 15 kg or less. The hollow interior may form a volume of the chamber. The volume of the chamber may be about 16,000 cm$^3$ or greater, about 32,500 cm$^3$ or greater, or even about 65,000 cm$^3$ or greater. The volume of the chamber may be about 150,000 cm$^3$ or less, about 100,000 cm$^3$ or less, about 85,000 cm$^3$ or less, or even about 75,000 cm$^3$ or less. The chamber may have a volume that is usable by an animal which can fit through an entry opening. The usable volume may be any volume such that the chamber may be used by an animal to excrete waste. The usable volume may be any volume such that an animal can enter, turn, and move around within the chamber. The volume of the chamber may be the usable volume, the total volume, or both. The usable volume may be the volume within the hollow interior of the chamber minus the volume occupied by litter and any components internally located within the chamber. The total volume may be the actual volume of the hollow interior of the chamber. The chamber may be formed by a single piece or a plurality of pieces. The chamber may include one or more filter systems affixed thereto, in fluid communication therewith, or both. The chamber may be formed by a single piece having a substantially spherical shape. The chamber may be formed by two or more pieces which mate to form a substantially spherical shape. The chamber may be formed by an upper chamber and lower chamber.

The chamber may include an upper chamber and a lower chamber. The upper chamber and the lower chamber may function to mate together to form the chamber, an entry opening, or both. The upper chamber and lower chamber may mate together to form a shape and/or size of the chamber. The upper chamber, lower chamber, or both may form 25% of the chamber or greater, 35% of the chamber or greater, or even 50% of the chamber or greater. For example, the upper chamber and lower chamber may each have a shape which is substantially hemispherical. The hemispherical shapes may mate together to form a shape which is substantially spherical, ovoidal, or the like. The upper chamber, lower chamber, or both may house one or more filter systems. The upper chamber, lower chamber, or both may include one or more filter cavities. The one or more filter cavities may function as a filter housing. For example, the lower chamber may include a filter cavity on an underside. An underside may be the surface of the lower chamber facing toward a waste drawer when the chamber is in a home position. The upper chamber, lower chamber, or both may include one or more flanges. The one or more flanges may be formed about one or more rims of the upper chamber, lower chamber, or both. The one or more flanges may mate with one or more other flanges. For example, a flange of an upper chamber may align and mate with a flange of a lower chamber. The upper chamber, lower chamber, or both may have one or more cut-outs, contours, and the like. The upper chamber, lower chamber, or both may have a cut-out which forms a portion of an entry opening. For example, the upper chamber may have a cut-out which forms an upper portion of an entry opening and the lower chamber may have a cut-out which forms a lower portion of an entry opening.

The chamber may include an axis of rotation. The axis of rotation may function as the relative axis about which the chamber rotates during one or more cleaning cycles. The axis of rotation may have any orientation such that the usable volume of a chamber is increased; the litter relative to the chamber has a conical rotation; litter is funneled toward a rear of the chamber (e.g., away from the front opening), toward and through a screen and/or septum, or both; a larger entry opening may be used without litter spilling therefrom; a screen and/or septum can be located further back in the chamber creating more internal space; or any combination thereof. The axis of rotation of the chamber may form an angle with a vertical plane, horizontal plane, or both. A vertical plane may be substantially in the direction of gravity, parallel to gravity, or both. A horizontal plane may be substantially perpendicular to a direction of gravity, parallel to a surface upon which the litter device rests, or both. The axis of rotation of the chamber may form any angle with a vertical plane, horizontal plane, or both so that one or more of the teachings herein are achieved. The axis of rotation may form an angle of about 88 degrees or less, about 85 degrees or less, about 80 degrees or less, about 75 degrees or less, or even about 70 degrees or less with a vertical plane. The axis of rotation may form an angle of about 40 degrees or greater, about 45 degrees or greater, about 50 degrees or greater, about 55 degrees or greater, about 60 degrees or greater, or even about 65 degrees or greater with a vertical plane. The axis of rotation may form an angle of about 40 degrees to about 88 degrees, of about 55 degrees to about 80 degrees, of about 40 degrees to about 85 degrees, or even about 60 degrees to about 75 degrees with a vertical plane. The axis of rotation may form an angle with the horizontal plane that is complementary to the angle relative to the vertical plane. The angled axis of rotation may funnel clumps of waste and/or litter, waste, or both toward a common location. The common location may be located toward a rear, bottom, or both of the chamber. The common location may be a septum, screen, waste opening, waste bin, or any combination thereof. The axis of rotation may allow for a single waste opening to be used, waste to be funneled toward the waste opening, waste to transfer for the waste opening to a waste bin, or any combination thereof.

The angled axis of rotation along with the frictional characteristics of the litter may result in a litter bed with an angle of repose. The angle of repose may function so that litter is angled away from an entry opening, litter is prevented from spilling from an entry opening, an entry opening may be as large as possible while keeping litter within the chamber, or any combination thereof. The angle of the litter bed may be angled such that the litter is angled away from an entry opening. Angled away from an entry opening may mean that a depth of the litter proximate to an entry opening is smaller than a depth of the litter more distant from the entry opening (e.g., the litter depth increases as the distance of the litter increases from the entry opening). The angle of the litter bed may be any angle such that the ability of an animal accidentally moving litter outside of opening is reduced compared to a litter bed that is free of an angle. Free of an angle may mean about perpendicular to the vertical plane, parallel to the horizontal plane, or both. The angle of the litter bed may form an angle that is about 89 degrees or less, about 88 degrees or less, about 87 degrees or less, or even about 85 degrees or less with the vertical plane. The angle of the litter bed may form an angle that is about 70 degrees or greater, about 75 degrees or greater, or even about 80 degrees or greater with the vertical plane. For example, the angle of the litter bed may be about 75 degrees to about 88 degrees, or even about 80 degrees to about 87 degrees with the vertical plane. The litter bed may rest on any surface of the chamber.

The chamber may include a coating. The coating may function to repel liquid (e.g., urine), prevent litter and/or waste from adhering to interior surfaces of the chamber, or both. The coating may reduce the friction between the litter and the interior surface of the chamber during a cleaning cycle. The coating may provide hydrophobic, superhydrophobic, or even super oleophobic effect. The coating may enable one or more surfaces of the litter device to be water resistant and/or even repel water. The coating may be a hydrophobic coating. The coating may be part of the interior surface, exterior surface, or both of the chamber, liner, or both. The coating may be part of any surface of the litter device which may come into contact with urine, feces, and/or animal litter. The coating may be applied during the manufacturing process, by a user, or both. For example, the coating may be a coating applied during and/or after the molding and/or forming process. As another example, a user may spray a coating on. Suitable coatings may include those found in US Publication No: 2014/0349061 and 2011/0303156, incorporated by reference herein in their entirety for all purposes.

The chamber may include a liner. The liner may prevent direct contact between litter and a chamber interior while the chamber is in a home position. The liner may cover a portion or all of an interior surface of the chamber. The liner may be any size, shape, and/or configuration such that it contacts the litter; retains litter, waste, liquids, solids, semi-solids, or a combination thereof in the chamber. The liner may be any size and/or shape such that it allows the litter resting thereon to absorb, encircle, clump, or a combination thereof to the waste after elimination by an animal. The liner may have a shape substantially reciprocal with the contour of a chamber, upper chamber, lower chamber, or a combination thereof. For example, the liner may have a shape which is substantially hemispherical. The liner may be directly adjacent to and in contact with an interior of the chamber. For example, the liner may be in direct contact with an interior surface of a lower chamber. The liner may be affixed to, free of attachment to, or both to a chamber. The liner may be at least partially affixed to a lower chamber. The liner may be partially free of attachment to any part of the chamber. Free of attachment may allow for the liner to temporarily distance itself from an interior surface of the chamber (e.g., drop, loosen) during one or more cleaning cycles. This distancing motion, whether dropping or loosening or the like, may allow for waste temporarily stuck to the liner to loosen and move toward the waste opening. One or more edges, a central region, or both may be affixed to, free of attachment to, or both to the chamber. For example, the edges of liner may be connected to the chamber while a central region may be free of attachment. The central region free of attachment may drop and/or loosen during a cleaning cycle while the edges remain affixed to the chamber. The liner may include a weight. The weight may function to cooperate with gravity, so the liner partially drops during a cleaning cycle, returns back to resting within the lower chamber when in a home position, or both. The weight may be affixed to, reside in, or both an underside of the liner. The weight may be located between a liner and lower chamber. The weight may be located in a weight cavity within the liner. The underside of the liner may include a weight cavity formed therein. The underside may be the side of the liner facing toward and adjacent to a lower chamber. The weight cavity may have a shape reciprocal with that of the weight. The weight cavity may be spherical, ovoidal, cylindrical, cuboidal, conical, pyramidical, the like, or any combination thereof. The liner may be comprised of a suitable material. The material may be non-stick; liquid impenetrable; resistant to damage, penetration, scent absorption, stain, or a combination thereof by litter, waste, liquids, solids, semi-solids, or a combination thereof. The liner material may be rubber, plastic, a synthetic material, a natural material, or any or a combination thereof.

The chamber includes an entry opening. The entry opening allows for one or more animals to comfortably enter and exit the chamber. The entry opening may be any size and shape so that one or more animals may enter and exit the chamber. The entry opening may be any size and shape so that during entry, use, and/or exiting by an animal; during one or more cleaning cycles; or any combination thereof litter is substantially maintained within the chamber. The entry opening may have a profile shape and/or cross-section which is substantially circular, ovular, elliptical, square, rectangular, trapezoidal, triangular, rhombus, the like, or any combination thereof. The profile shape may be a shape looking at an opening plane straight on, perpendicular, or both. The entry opening may have a profile shape which is symmetrical, non-symmetrical, or both. An entry opening which is circular, ovular, or the like may offer a more comfortable and larger entry area, may avoid sharp vertices that may scratch an animal, may avoid sharp vertices which may catch litter upon exit of the animal from the chamber, or a combination thereof.

The entry opening may form an opening plane. The opening plane may extend along the entry opening (e.g., along a surface that extends from the top of the entry opening to the bottom of the entry opening). The entry opening, the opening plane, or both may form an angle with a vertical plane. The entry opening, opening plane, or both may form an angle with the vertical plane of about 5 degrees or more, about 10 degrees or more, or even about 15 degrees or more, about 18 degrees or more, or even about 20 degrees or more. The entry opening, opening plane, or both may form an angle with the vertical plane of about 60 degrees or less, about 45 degrees or less, about 30 degrees or less, or even about 25 degrees or less. For example, the entry opening, opening plane, or both may form an angle with the vertical plane of about 10 degrees to about 30 degrees. As another example, the entry opening, opening plane, or both may form an angle with the vertical plane of about 15 degrees to about 25 degrees (i.e., about 20 degrees). The angle of the entry opening, opening plane, or both relative to the vertical plane may allow for litter to be maintained within the chamber, the entry opening to be as large as possible while maintaining litter within the chamber, provide a larger interior surface area for a litter bed, allow for one or more sensors to have a line of sight into an interior of the chamber, or any combination thereof.

The entry opening may include one or more axes. The one or more axes may assist in defining the width, height, shape, cross-sectional area, or any combination thereof of the entry opening. The one or more axes may include a primary axis and secondary axis. A primary axis may be substantially parallel with the opening plane, angled relative to the vertical plane and/or horizontal plane, may extend from the top of the entry opening to the bottom of the entry opening, or any combination thereof. The top of the entry opening may be defined as opposite the bottom. The bottom may be defined as a portion closest to the base of the litter device.

The primary axis may define a height of the entry opening. A secondary axis may be substantially parallel with the opening plane, perpendicular to the primary axis, parallel with a horizontal plane, may extend from one side to an opposing side, or any combination thereof. The secondary axis may define a width of the entry opening. The length of the primary axis and the length of the secondary axis may form a ratio. The ratio may be such that an animal can comfortably fit within the entry opening to enter and exit the chamber, litter and waste contents remain within the chamber, or both. The ratio of the length of the primary axis to the secondary axis may be about 1:3 or greater, about 1:2.5 or greater, about 1:2 or greater, about 1:1.5 or greater, about 1:1.2 or greater, or even about 1:1 or greater. The ratio of the length of the primary axis to the secondary axis may be about 3:1 or less, about 2.5:1 or less, about 2:1 or less, about 1.5:1 or less, about 1.2:1 or less, or even about 1.1:1 or less. The axis of rotation may run at an angle relative to the primary axis, secondary axis, or both. The axis of rotation may be at an angle acute, perpendicular, or obtuse to the primary axis, secondary axis, or both. The axis of rotation may be at an angle of about 60 degrees or greater, about 70 degrees or greater or even about 85 degrees or greater relative to the primary axis, secondary axis, opening plane, or any combination thereof. The axis of rotation may be at an angle of about 120 degrees or less, about 110 degrees or less, or even about 95 degrees or less relative to the primary axis, secondary axis, opening plane, or any combination thereof. For example, the axis of rotation may be at an angle of about 85 degrees to about 95 degrees (e.g., about 90 degrees) relative to the primary axis and secondary axis.

The entry opening has a cross-sectional area. The cross-sectional area may be sufficiently large to comfortably accommodate an animal entering and exiting the chamber while maintaining litter and waste within the chamber. The cross-sectional area may be the cross-sectional area of the profile shape of the entry opening. The cross-sectional area may be measured along one or more planes parallel to the opening plane, primary axis, secondary axis, or a combination thereof. The cross-sectional area of the entry opening may be about 300 cm$^2$ or greater, about 500 cm$^2$ or greater, about 700 cm$^2$ or greater, about 900 cm$^2$ or greater, about 1,100 cm$^2$ or greater, or even about 1,200 cm$^2$ or greater. The cross-sectional area of the entry opening may be about 5,000 cm$^2$ or less, about 4,000 cm$^2$ or less, about 3,000 cm$^2$ or less, about 2,000 cm$^2$ or less, or even about 1,500 cm$^2$ or less. The height of the entry opening along a primary axis may be about 20 cm or greater, about 25 cm or greater, about 30 cm or greater, or even about 40 cm or greater. The height of the entry opening along a primary axis may be about 75 cm or less, about 60 cm or less, about 55 cm or less, or even about 50 cm or less. The height and width of the entry opening may be defined by an inner surface of a chamber, bezel, or both at the entry opening. The entry opening may include an entry lip.

The litter device may include a bezel. The bezel may function to define the entry opening, provide an aesthetic appearance of a front of the litter device, maintain litter within the chamber, seal off any joints along the front of the device from litter, seal off any pinch points at and/or around the entry opening, house one or more sensors, house one or more control panels, removably retain one or more accessories, the like, or any combination thereof. The bezel may have any shape, size, and/or form such the bezel may be able to provide a barrier for litter and/or other waste remnants while not interfering with entry and egress of an animal from the chamber. The bezel may have any size and/or shape for defining and/or encircling an entry opening. The bezel may have a shape substantially reciprocal, similar, and/or same as the entry opening. The bezel may have a shape reciprocal, similar, and/or partially the same as one or more accessories, mounting brackets of an accessory, or both. The bezel may have a substantially circular and/or oval cross-sectional shape with an opening therein. The bezel may have a shape which is substantially annular. The opening may define part of the entry opening and have similar and/or same dimensions as suitable for the entry opening. The bezel may have a shape and size so as to conceal one or more rims, edges, or both of a bonnet, base frame, chamber, or a combination thereof. The bezel may have a shape and size so as to conceal the space between a chamber and bonnet, chamber and base frame, or both. The bezel may include one or more surfaces, such as one or more front surfaces, flanges, mating features, openings (e.g., entry opening), the like, or any combination thereof.

The bezel may be formed as a single piece or multiple pieces. The bezel may include an inner bezel, outer bezel, or both. The outer bezel may function to provide an aesthetically appealing bezel about the entry opening, conceal one or more components affixed to the inner bezel, or both. The inner bezel may function to retain one or more electrical components, affix the bezel to a bonnet, base, or both. The inner bezel and outer bezel may cooperate together to define a gap therebetween. The gap within the bezel may house one or more sensors, electrical components, control panels or components thereof, or any combination thereof. The inner bezel may be permanently and/or removably affixed to a bonnet, base frame, outer bezel, or a combination thereof. The inner bezel, outer bezel, or both may be affixed to the outer bezel, inner bezel, bonnet, base frame, or a combination thereof by one or more fasteners. The one or more fasteners may include one or more threaded fasteners (e.g., screw, bolt, nut), interlocking tabs, rivets, pins, the like, or a combination thereof. The inner bezel may be affixed to both the base frame and the bonnet. The inner bezel may be affixed along cut-outs of the base frame and bonnet which define an entry opening. The outer bezel may then be affixed to the inner bezel.

The bezel may include one or more surfaces. One or more surfaces may function to provide an aesthetically appealing exterior; seal off one or more gaps between the chamber, bonnet, and/or base; provide one or more reciprocal features for removably affixing one or more accessories thereon; or any combination thereof. The one or more surfaces may include a front surface, one or more flanges, one or more bevels, one or more grooves, or any combination thereof.

The bezel may include one or more front surfaces. A front surface may function as the outside surface of the bezel. The front surface may be substantially planar, may be curved, may have one or more indentations formed therein, may have one or more protrusions extending therefrom, or any combination thereof. The front surface may surround the entry opening. The front surface may define a portion of the entry opening. The front surface may have an annular shape. The front surface may be integrally connected to one or more flanges. The front surface may have one or more flanges projecting therefrom.

The bezel may include one or more flanges. An inner flange may project from an interior periphery of the front surface. An inner flange may be the inner peripheral surface of the bezel. An outer flange may project from an exterior periphery of the front surface. An outer flange may be the outer peripheral surface of a bezel. An inner and outer flange may project in substantially the same direction from the front surface. The inner and outer flange may project toward a bonnet, base, chamber, a rear of the litter device, or any combination thereof. One or more flanges may project at an angle less than, about equal to, or even greater than perpendicular from the front surface. An outer flange may extend at an angle of about 70 degrees or greater, about 80 degrees or greater, or even about 90 degrees or greater relative to the front surface. An outer flange may extend at an angle of about 150 degrees or less, about 140 degrees or less, about 130 degrees or less, or even about 120 degrees or less relative to the front surface. An inner flange may extend at an angle of about 50 degrees or greater, about 65 degrees or greater, about 75 degrees or greater, or even about 80 degrees or greater relative to the front surface. An inner flange may extend at an angle of about 120 degrees or less, about 100 degrees or less, or even about 90 degrees or less relative to the front surface. The inner flange, outer flange, and front surface may form an annular channel-like shape. A channel-like shape may refer to a C-channel. The front surface may transition to one or more flanges via one or more bevels, chamfers, fillets, edges, or any combination thereof.

The bezel may include one or more mating features. One or more mating features may function to mate with and/or engage one or more accessories. One or more mating features may be any feature suitable for temporarily and/or removably retaining one or more accessories onto the bezel. One or more mating features may include one or more indentations, protrusions, reciprocal features, and/or the like. One or more mating features of the bezel may receive and/or be received in one or more mating features of one or more accessories. One or more mating features may include a groove. One or more indentations may include one or more grooves. One or more mating features may be formed on one or more surfaces of the bezel. For example, a groove may be formed on the front surface. A mating feature may go about a portion or all of the front surface. A mating feature may partially or completely encircle an opening (e.g., entry opening), an inner flange, or both. A mating feature may be substantially adjacent to an inner periphery of a bezel. A mating feature may be located substantially and/or directly adjacent to an inner flange, bevel, chamber, fillet, edge, or a combination thereof. A mating feature may be located on a front surface closer to an inner flange than an outer flange. A mating feature may have a size and/or shape reciprocal to one or more retention tabs of one or more accessories. For example, a groove may receive one or more retention tabs of an accessory therein to removably retain the accessory on the bezel. The mating feature may have a shape (e.g., 2D cross-section) which is substantially c-shaped, v-shaped, a portion of a streamlined body shape, a portion of a tear-drop shape, square, rectangular, the like, or any combination thereof. The mating feature may be rounded (e.g., without having defined edges), squared (e.g., having defined edges), or a combination of both. The mating feature may have a depth relative to the overall thickness of a bezel. The thickness of a bezel may be measured as the distance from the front surface to a rear edge of a flange. The depth of a mating feature may be measured as the distance between the front surface outside of the indentation and the front surface at the indentation. The depth of a mating feature may be about 0.05% or greater, about 1% or greater, about 1.5% or greater, or even about 2% or greater relative to a thickness of a bezel. The depth of a mating feature may be about 5% or less, about 4% or less, or even about 3.5% or less relative to a thickness of a bezel.

The bezel may be comprised of one or more materials suitable for exposure to litter, waste, moisture, fumes, and the like. Examples of materials that can be used are rubber, plastic, metal, ceramic, or a combination thereof. The bezel may be made of the same or a different material as the bonnet, base frame, or both.

The inner bezel, outer bezel, or both may include one or more mounts extending therefrom and into the gap of the bezel, toward the opposing bezel, into an interior of a bezel, to an exterior of the bezel, or a combination thereof. One or more mounts may include one or more sensor mounts, control mounts, or both. One or more sensor mounts may include one or more sensor boards. One or more sensor mounts may retain one or more sensors. One or more sensor mounts may be located within an interior, exterior, or both of the bezel. One or more control mounts may house and/or retain one or more control panels and/or user interfaces. One or more control mounts may be located within an interior, exterior, or both of the bezel.

The litter device may include one or more accessories. The one or more accessories may function to aid an animal in entering and/or exiting the chamber, prevent and/or reduce litter and/or waste from exiting the chamber upon an animal leaving (e.g., stepping out), groom the animal upon entering and/or exiting, promote an animal's desire to groom themselves, monitor behavior of an animal, entice an animal to enter into the chamber, promote better posture for waste elimination within the chamber, the like, or any combination thereof. The one or more accessories may be located on one or more portions of the litter device. The one or more accessories may be located on a bezel, chamber, bonnet, step, base, the like, or any combination thereof. The one or more accessories may be removably affixed to one or more portions of the litter device. For example, one or more accessories may be removably affixed to the bezel, chamber, bonnet, step, base, the like, or any combination thereof. The one or more accessories may include one or more features for being removably affixed to a portion of the chamber. The one or more accessories may be referred to as one or more removable accessories. The one or more accessories may remain static and/or be moveable once installed to a bezel. For example, one or more portions of one or more accessories may be rotatable. The accessories may be rotatable about a hinge, mounting bracket, and/or the like. The one or more accessories may include a mounting bracket. The one or more accessories may include and/or be one or more litter guards, grooming aids, step aids, cameras, scratch aids, enticement accessories, odor neutralizing system, the like, or a combination thereof.

The one or more accessories may include a mounting bracket. A mounting bracket may function to temporarily and/or permanently affix one or more accessories to a portion of the litter device. A mounting bracket may provide a common mounting structure for a variety of accessories onto the litter device, such as the bezel. By having a common mounting structure, a litter device is able to be easily customized by a consumer to fit their household and pet's needs. A mounting bracket may be able to be removably affixed to a bezel, chamber, bonnet, step, base, the like, or any combination thereof. Removably affixed may mean that a component can be affixed to a portion of the device, easily removed, re-affixed a plurality of times. This may allow a consumer to mix and match accessories to cooperate together with the litter device, to find optimal placement for their animal, to remove for cleaning of the accessory and/or of the device, and the like. The one or more mounting brackets may be removably affixed to a portion of the litter device (e.g., bezel) with a friction fit, snap fit, locks, lock tabs, biasing devices, mating features, the like, or any combination thereof. The mounting bracket may have a shape partially and/or substantially reciprocal with one or more portions of a litter device, such as the bezel and/or entry opening. For example, the mounting bracket may have a shape substantially reciprocal to a shape of a bezel. A mounting bracket or portion of a mounting bracket may have a shape which is substantially C-shaped, V-shaped, channel shaped, the like, or a combination thereof. The mounting bracket may be formed as one piece or a plurality of pieces. The mounting bracket may include one or more base members, front flanges, rear flanges, walls, retention tabs, a mating gap, the like, or a combination thereof.

The mounting bracket may include one or more base members. A base member may function as a bridge between flanges, a support for features of the accessory, a secondary layer of a bezel or other portion of the litter device, or any combination thereof. A base member may rest directly on one or more portions of a litter device. A base member may rest on a bezel, surface in which the entry opening passes through, or both. A base member may rest on an inner periphery of a bezel, surface which defines the entry opening, or both. A base member may rest upon an inner flange of a bezel. A base member may have a shape substantially similar to a portion of the litter device which it rests on. A base member may be curved, planar, or both. A curved shape may be at least partially annular (e.g., crescent and/or sickle shaped). A partially annular shape may be reciprocal to the annular shape of the bezel, such as the inner flange. A base member may have a width. A width may be measured as a distance between a front flange and an opposing rear flange. A width of the base member may be less than, equal to, or greater than a thickness of a bezel, the overall length of an inner flange of a bezel (e.g., from front surface to edge), or both. A base member may be a bridge between one or more front flanges and rear flanges, a bridge between one or more front flanges and one or more walls, a bridge between one or more walls, or any combination thereof. A base member may have one or more flanges, walls, or both integrally formed therewith.

The mounting bracket may include one or more front flanges. A front flange may function to retain a mounting bracket to a portion of a litter device, support one or more retention tabs, cooperate with one or more rear flanges and/or walls to provide a clamping force about a portion of the litter device, or any combination thereof. A front flange may project from a base member. A front flange may project away from an opening (e.g., entry opening). A front flange may project from a base member at an angle which is less than, about equal to, or greater than perpendicular. A front flange may project from a base member at an angle for about 75 degrees or greater, about 90 degrees or greater, or even about 100 degrees or greater. A front flange may project from a base member at an angle of about 130 degrees or less, about 120 degrees or less, or even about 110 degrees or less. A front flange may be integrally formed and/or affixed to the base member. A front flange may rest upon, abut with, and/or even engage with a front surface of a bezel. A front flange may have a height which is less than, about equal to, or even greater than a length of a front surface of a bezel. A length of a front surface of a bezel may be measured as the distance between an inner flange and outer flange of a bezel, opposing edges of a front surface of a bezel which define the inner and outer peripheries, or both. A front flange may have a height which is about 5% or greater, about 10% or greater, about 15% or greater, about 20% or greater, or even about 25% or greater of a length of a front surface of a bezel. A front flange may have a height which is about 100% or less, about 75% or less, about 50% or less, about 40% or less, about 35% or less of a length of a front surface of a bezel.

The mounting bracket may include one or more rear flanges. A rear flange may function to retain a mounting bracket to a portion of a litter device, cooperate with one or more front flanges to provide a clamping force about a portion of the litter device, or both. A rear flange may project from a base member. A rear flange may project away from an opening (e.g., entry opening). A rear flange may project from a base member at an angle which is less than, about equal to, or greater than perpendicular. A rear flange may project from a base member at an angle which is about 50 degrees or greater, about 60 degrees or greater, about 70 degrees or greater, or even about 75 degrees or greater. A rear flange may project from a base member at an angle which is about 130 degrees or less, about 110 degrees or less, about 100 degrees or less, or even about 90 degrees or less. A rear flange may be integrally formed and/or affixed to the base member, a wall, or both. A rear flange may be part of a wall which extends from the base member. A rear flange may extend in generally a same direction as a front flange. A rear flange may rest upon, abut with, and/or even engage with one or more flanges and/or edges of a bezel. A rear flange may rest upon, abut with, and/or even engage with a rear edge of a bezel. For example, the rear flange may abut to an edge of an inner flange of a bezel. A rear flange may have a height which is less than, about equal to, or even greater than a height of a front flange of the mounting bracket. A rear flange may have a height which is about 20% or greater, about 30% or greater, about 40% or greater, or even about 50% or greater of a height of a front flange. A rear flange may have a height which is about 200% or less, about 100% or less, about 80% or less, about 75% or less, about 70% or less, or even about 65% or less of a height of a front flange.

The mounting bracket may include a mating gap. A mating gap may function to receive and engage with a portion of the litter device. For example, a mating gap may receive a portion of a bezel therein. The mating gap may allow for the mounting bracket to have a secure fit with the bezel. The mounting bracket may comprise a base member. The mating gap may be the distance between one or more flanges. The mating gap may be the distance between one or more front flanges and one or more rear flanges, one or more front flanges and one or more walls, or both. The mating gap may have a size such that the mounting bracket has an interference fit (e.g., press fit, friction fit), a snap fit, or the like with a portion of the litter device (e.g., bezel). One or more mating features may cooperate with the mating gap to ensure the mounting bracket is securely affixed to a portion of the litter device while also being easily removable.

The mounting bracket may include one or more mating features. One or more mating features may function to mate with and/or engage one or more portions of a litter device (e.g., one or more mating features of the bezel). One or more mating features may be any feature suitable for temporarily affixing one or more accessories to one or more portions of the litter device. One or more portions of the litter device may include the bezel, chamber, bonnet, base, the like, or a combination thereof. One or more mating features may include one or more indentations, protrusions, reciprocal features, and/or the like. One or more mating features may include one or more features reciprocal with one or more mating features of a bezel. One or more mating features of the mounting bracket may be received in and/or may receive one or more mating features of a bezel. One or more mating features may include one or more retention tabs. One or more protrusions may include one or more retention tabs. One or more mating features may include a single mating feature or a plurality of mating features. One or more mating features may be formed at one or more ends of a mounting bracket. One or more mating features may be formed in a surface of the mounting bracket facing toward a surface of another portion of the litter device. One or more mating features may be formed in a surface of the mounting bracket facing toward a surface of a bezel. One or more mating features may be formed on a surface of the front flange (e.g., rear surface) facing toward a surface of a bezel (e.g., front surface). One or more mating features of the mounting bracket may have a mating relationship with one or more mating features of the bezel. One or more protrusions of the mounting bracket may rest within one or more indentations of the bezel. For example, a plurality of retention tabs may rest within a groove of the bezel. One or more mating features may have a shape generally reciprocal with a shape of one or more mating features of a bezel. One or more retention tabs may have a shape generally reciprocal with a groove of a bezel. One or more mating features may have a shape (e.g., 2D cross-section) which is generally half-spherical, half tear-drop shape, a streamlined half body shape, square, rectangular, triangular, the like, or any combination thereof.

The mounting bracket may include one or more walls. One or more walls may function as one or more supports for other component(s) of an accessory, as one or more litter guards, and/or the like. The one or more walls may extend from one or more members and/or flanges of one or more mount brackets. One or more walls may be affixed to, integrally formed with, or both one or more members and/or more flanges of one or more mount brackets. For example, one or more walls may project from a base member. As another example, one or more walls may project from and/or be an extension of one or more flanges (e.g., rear flange). The one or more walls may include a wall, a hinge wall, or both. A wall may be referred to as a rear wall. A wall may project from a base member in an opposite direction, same direction, or both as one or more flanges, other walls, or both. A wall may project from a bae member in generally an opposite direction as a front flange, rear flange, or both. A wall may project from a member (e.g., base member) at an angle which is less than, about equal to, or greater than perpendicular. A wall may project from a member at angle substantially supplementary to one or more flanges. For example, the angle at which a wall projects from the base member may be a supplementary angle to the angle at which one or more rear flanges project from the base member. A wall may project from a base member at an angle which is about 130 degrees or less, about 120 degrees or less, about 110 degrees or less, or even about 105 degrees or less. A rear flange may project from a base member at an angle which is about 50 degrees or greater, about 70 degrees or greater, about 80 degrees or greater, or even about 90 degrees or greater. A wall, such as a rear wall, may be continuous with one or more rear flanges. One or more walls may be located between one or more flanges and one or more other walls. For example, a hinge wall may be located between a front flange and a rear wall. One or more walls may be parallel with one another, project in the same direction, or both. One or more walls may have a shape which is, at least partially, reciprocal with all or a portion of a base member, the entry opening, bezel, chamber interior, chamber exterior, bonnet, or any combination thereof. For example, one or more walls may have a shape partially reciprocal with a portion of the entry opening and the base member. The one or more litter guards may have a cross-sectional shape (e.g., 2D) which is substantially and/or partially shaped like a chord (e.g., D-shaped), circular, rectangular, trapezoidal, triangular (e.g., V-shaped), the like, or any combination thereof. The one or more walls may have a height of about 5% or greater, 7% or greater, or even 10% or greater of the total height of the entry opening. The one or more walls may have a height of about 25% or less, about 20% or less, or even about 15% or less of the total height of the entry opening. A height may be measured as the distance of the wall from where the wall projects from the base member to an opposing edge of the wall.

The mounting bracket may include one or more hinges. One or more hinges may be useful for temporarily moving one or more portions of an accessory while leaving the accessory retained onto a portion of the litter device. One or more hinges may be affixed to and/or part of one or more accessories. One or more hinges may be located on any portion of the mounting bracket useful for affixing one portion of the accessory to the mounting bracket. One or more hinges may be affixed to and/or supported by one or more members, flanges, and/or walls. For example, one or more hinges may be located between a hinge wall and a rear wall of a mounting bracket. One or more hinges may include one or more pivot mechanisms. One or more pivot mechanisms may form the pivot of the hinge. One or more pivot mechanisms may include one or more pintles. One or more pintles may be a pin, bolt, shaft, and/or the like. One or more pivot mechanisms may be integral with and/or affixed to the mounting bracket. One or more pivot mechanisms may be located between a hinge wall and a rear wall. One or more pivot mechanisms may be affixed to, integral with, or both with a hinge wall, rear wall, base member, or any combination thereof. One or more pivot mechanisms may be located above, affixed to, even partially integral with a base member. One or more hinges may include one or more hinge leaves. One or more hinge leaves may function to pivot about the pivot mechanism. One or more hinge leaves may function to connect a hinge to one or more components of an accessory. One or more hinge leaves may be affixed to one or more portions of one or more step aids, camera assemblies, litter guards, scratch aids, and/or the like. One or more hinge leaves may be located between, affixed to, or both, one or more hinge walls, rear walls, or both of a mounting bracket. One or more hinge leaves may be rotatably affixed to a pivot mechanism. One or more hinge leaves may include one or more knuckles or similar for receiving at least a portion of a pivot mechanism therethrough.

The mounting bracket may include one or more through openings. One or more through openings may allow for litter and/or waste which collects on a mounting bracket to be easily relocated into an interior of the chamber. One or more through openings may be formed between one or more members, walls, flanges, or a combination thereof. One or more through openings may be formed between one or more base members and one or more rear walls. One or more through openings may be located between rear flanges. One or more through openings may result in a rear flange, rear wall, or both being discontinuous along a rear edge of a base member. One or more through openings may have a height relative to a height of a wall (e.g., rear wall). One or more through openings may have a height of about 3% or greater, 5% or greater, 7% or greater, or even 10% or greater of a height of a wall (e.g., rear wall). One or more through openings may have a height of about 25% or less, about 20% or less, about 15% or less, or even 12% or less of a height of a wall (e.g., rear wall). A height of the through opening should be sufficient to easily allow for litter collected on a base member to be easily transferred back into an interior of a chamber but to avoid litter from the interior of the chamber from exiting the chamber therethrough.

The one or more accessories may include one or more litter guards. The one or more litter guards may function to prevent and/or reduce litter and/or waste from exiting the chamber upon an animal leaving (e.g., stepping out). The one or more litter guards may be located along and/or in proximity to an entry opening. The one or more litter guards may be affixed to, integral with, and/or include one or more mounting brackets, integrated into the bezel, integrated into the chamber, the like, or any combination thereof. The one or more litter guards may be one or more walls, be affixed to one or more walls, or both of one or more mounting brackets. A mounting racket having a wall (e.g., rear wall) may function as a litter guard. The one or more litter guards may be located at and/or near a bottom of an entry opening. The one or more litter guards may have a shape or a portion of a shape reciprocal or not reciprocal with at least a portion of the mounting bracket (e.g., base member), entry opening, bezel, chamber interior, chamber exterior, bonnet, or any combination thereof. The one or more litter guards may have a cross-sectional shape (e.g., 2D) which is shaped like a chord (e.g., D-shaped), circular, rectangular, trapezoidal, triangular (e.g., V-shaped), the like, or any combination thereof. The one or more litter guards may be removably or permanently affixed. The one or more litter guards may have a height suitable for keeping litter within the chamber while allowing an animal to easily step over while entering and exiting the chamber. A height of a litter guard may be the same or similar to a height of one or more walls. The one or more litter guards may include or be free of one or more grooming portions.

The one or more accessories may include one or more grooming portions. The one or more grooming portions may function to comb hair of an animal, remove particles from the animal, or both. The one or more grooming portions may remove particles (e.g., litter particles, waste remnants, dust, allergens) that collect within and/or on the hair, paws, and/or the like of an animal. The one or more grooming portions may remove the particles when an animal passes over, through, or both the grooming portion; enters and/or exits a chamber; passes through an entry opening; or any combination thereof. The one or more grooming portions may be flexible, rigid, or a combination of both. The one or more grooming portions may be flexible along their length, hinge and/or flex where the grooming portions meets and/or adjoins with a wall, mounting bracket, bezel, chamber, base, bonnet, and/or the like. The one or more grooming portions may be static, movable, or both. The one or more grooming portions may be made of one or more metals, polymers, and/or the like. For example, silicone and PVC may be useful. The one or more grooming portions may include one or more woven and/or non-woven materials. For example, felt may be a useful material. The one or more grooming portions may include one or more teeth, bristles, and/or spikes. One or more grooming portions may resemble teeth, bristles, and/or spikes of a comb, brush, or the like. The one or more grooming devices may extend inward toward the center of the entry opening, chamber, or both. The one or more grooming devices may extend inward toward a center of an entry opening and away from a litter guard, mounting bracket, or both. The one or more grooming devices may extend outward, away from an exterior of the litter device, interior of a chamber, or both. The one or more grooming portions may be integral with, permanently affixed, and/or removably affixed to one or more mounting brackets, litter guards, bezels, chambers, bonnets, bases, other surfaces of a litter device, or any combination thereof. The one or more grooming portions may be located along one or more surfaces and/or edges of one or more mounting brackets, litter guards, bezels, chambers, bonnets, bases, other surfaces of a litter device, or any combination thereof. The one or more grooming portions may extend from a rear wall of a mounting bracket.

The one or more accessories may include one or more scratch aids. One or more scratch aids may function to promote grooming, stretching, use of the litter device, and/or the like by an animal. An animal may desire to scratch prior to and/or after eliminating waste. One or more scratch aids may fulfill such a desire with a suitable scratching surface as opposed to other surfaces in a consumer's home (e.g., a sofa near the litter device). One or more scratch aids may be located along and/or in proximity to an entry opening. The one or more scratch aids may be affixed to, integral with, and/or include one or more mounting brackets, bezel, chamber, bonnet, the like, or any combination thereof. The one or more scratch aids may be, be affixed to, and/or be integral with one or more walls, flanges, or both of one or more mounting brackets.

The one or more scratch aids may include one or more scratching portions. A scratching portion may be configured to be exposed and usable by an animal. A scratching portion may include one or more materials which are suitable for scratching, attract one or more animals for scratching, or both. Scratching may mean include an animal rubbing their body against a scratching portion to provide relief, comfort, or even leaving scent marks. Scratching may mean an animal scratching their claws upon a scratching portion such as to file and groom their claws. One or more scratching portions may be formed on and/or project from one or more portions of a mounting bracket. One or more scratching portions may be located on one or more front flanges of a mounting bracket. A front flange location may attract an animal to stretch, groom their claws, or rub against the scratching surface prior to and/or after exiting the litter device. One or more scratching portions may extend rearward from a mounting bracket, into the chamber, away and/or opposite a base member, the like, or any combination thereof. One or more scratching portions may be affixed to one or more walls of a mounting bracket. One or more scratching portions may be affixed to one or more rear walls of a mounting bracket. By extending away from a base member and into a chamber of the litter device, an animal may be attracted to rub a portion of their body against the scratching portion upon entering the chamber, prior to exiting the chamber, while within the chamber, or any combination thereof. A mounting bracket may have a single or a plurality of scratching portions affixed thereto. For example, the mounting bracket may include a front flange with a scratching portion and a rear wall with a scratching portion. A scratching portion may include or be comprised of one or more materials for scratching. One or more materials may include one or more textured fabrics, teeth, spikes, bristles, or a combination thereof. One or more materials may include one or more polymers, organic materials, the like, or a combination thereof. One or more polymers may include silicone, nylon, and/or the like. One or more organic materials may include sisal, jute, other fibrous materials, the like, or any combination thereof. A scratching portion may be textured (e.g., ribbed, corrugated, etc.).

The one or more accessories may include one or more step aids. One or more step aids may allow for an animal to comfortably enter and exit the chamber via an opening. The one or more step aids may be particularly beneficial in allowing one or more smaller animals (e.g., kittens), elderly animals, or those with limited mobility, to comfortable enter and exit the chamber with minimal jumping and/or stretching. The one or more step aids may have any size and shape which allows one or more animals to comfortably enter and exit the chamber opening. The one or more step aids may replace the use of, cooperate with, or both one or more steps affixed to a waste drawer. The one or more step aids may be located on a same side of a device as an entry opening. The one or more step aids may be affixed to a bezel, base, chamber, waste drawer, the like, or any combination thereof. The one or more step aids may be removably affixed to a bezel. The one or more step aids may include, be affixed to, or be integrated with a mounting bracket. The one or more step aids may include and/or be affixed to a hinge. A hinge may allow for a step aid to be easily rotated away from a waste drawer, allow access to a waste drawer, clean a ramped portion, or any combination thereof.

The one or more step aids may include a ramped portion. A ramped portion may include a ramp, one or more steps (e.g., a plurality of steps), and/or the like. A ramped portion may be affixed to a mounting bracket. A ramped portion may be rotatably affixed to a mounting bracket. A ramped portion may be rotatably affixed to a mounting bracket via one or more hinges. A ramped portion may be affixed to one or more hinge leaves, knuckles, and/or pivot mechanisms. One or more reciprocal components of a hinge may be affixed to and/or integral with a mounting bracket. One or more ramps, steps, or both may have any size, shape, and/or configuration to allow for an animal to step into the chamber and/or out of the chamber. The one or more steps may have a cross-sectional shape which is partially and/or substantially rectangular, square, trapezoidal, rhombus, triangular, circular, half-circle (e.g., half-moon), the like, or any combination thereof. The cross-sectional shape may refer to the shape substantially parallel with the ground, horizontal plane, or other supporting surface. The ramped portion may have a surface adapted to remove litter, waste, and/or other debris from an animal's paws, such as upon exiting the chamber. The ramped portion may have a surface with one or more contours. Contoured may mean textured, ribbed, grated, corrugated, slotted, the like, or any combination thereof. The contours may include peaks and valleys. The peaks may be useful for removing litter and such from an animal's paws upon contact. The valleys may be useful for collecting the litter, waste, and/or other debris. The ramped portion may be cleaned by dusting and/or sweeping. The ramped portion may be cleaned by rotating upward and facing the ramped portion toward and/or into the chamber of the litter device. By rotating the ramped portion about the hinge, the litter and such which collects on the ramped portion may be disposed within an interior of the chamber with the aid of gravity.

The one or more accessories may include one or more camera assemblies. One or more camera assemblies may function to monitor behavior of one or more animals within the litter device, outside and in proximity to the litter device, or both. One or more camera assemblies may function to monitor an ambient environment around the litter device. One or more camera assemblies may be located along and/or in proximity to an entry opening, one or more sensors, one or more sensor boards, and/or the like. The one or more camera assemblies may include, be affixed to, and/or be integral with one or more mounting brackets, bezel, chamber, bonnet, the like, or any combination thereof. The one or more camera assemblies may include a mounting bracket, camera, swivel mount, and/or the like. The one or more camera assemblies may be removably affixed to the bezel. The one or more camera assemblies may be affixed to the bezel along any portion which can see into the chamber, outside of the chamber, or both. The one or more camera assemblies may be mounted at an upper portion of a bezel, side portion of a bezel, bottom portion of a bezel, or any position therebetween. Being mounted to an upper portion of a bezel may provide a view into a majority of a chamber interior, over a litter bed, or both. The view into the chamber may be optimal due to the tilted axis of rotation of the chamber. A camera assembly may include a camera affixed to a mounting bracket via a swivel mount. A mounting bracket may include one or more swivel mounts affixed thereto and/or integrated therewith. One or more swivel mounts may be affixed to and/or integral with one or more members, walls, and/or flanges. A swivel mount may allow for a camera to be easily rotated in multiple directions (e.g., up, down, sideways, angled, etc.). One or more cameras may include any camera able to capture a continuous stream, discontinuous stream (e.g., slower frames per second), or both. One or more cameras may include any camera adapted for communicating over the Internet, such as wirelessly via Wi-Fi. One or more exemplary cameras may include one or more cameras from Wyze, such as the Wyze Cam v3 and Wyze Cam, which are incorporated herein by reference in their entirety for reference for all purposes.

The one or more accessories may include one or more enticement accessories. One or more enticement features may function to promote an animal fully entering the chamber before eliminating waste. By fully entering the chamber, the risk of urine spray and/or fecal matter being partially eliminated outside of the chamber is significantly reduced. The one or more enticement accessories may be located along and/or in proximity to an entry opening, within an interior of the chamber, or both. The one or more enticement accessories may be affixed to, integral with, and/or include one or more mounting brackets, bezel, chamber, bonnet, the like, or any combination thereof. The one or more enticement accessories may include one or more enticement features. One or more enticement features may be affixed to, integral with, or both one or more walls, flanges, or both of one or more mounting brackets. One or more enticement features may include a single or a plurality of enticement features. A plurality of enticement features may cooperate together. One or more enticement features may include one or more hanging lures, light emitting devices, sound emitting devices, the like, or any combination thereof. One or more hanging lures may be configured to hang at the entry opening, within the interior of the chamber, or both. One or more hanging lures may include one or more feathers, balls, or the like. One or more animals may be curious and/or want to play with the lure, thus enticing the animal to fully enter the chamber. One or more light emitting devices may emit one or more lights into an interior of the chamber, may display one or more lights on the interior wall of the chamber, or both. The light emitted by the light emitting device may be substantially static and/or movable. An animal may be curious as to the light and fully enter the chamber. The one or more light emitting devices may be turned on when the presence of an animal is sensed in proximity to and/or entering the litter chamber.

The one or more light emitting devices may be affixed to a mount, affixed to the bezel, or both. As an alternative to being affixed to a mounting bracket, the one or more light emitting devices may be located on the same sensor board as one or more sensors. One or more sound emitting devices may emit one or more sounds from within the interior of the chamber. One or more sound emitting devices may be located within the chamber, the base, or both. One or more sound emitting devices may be located toward a rear of the litter device. One or more sound emitting devices may include one or more transducer speakers. An animal may be curious as to the sound and the source of the sound, thus promoting the animal fully entering the chamber to explore prior to waste elimination.

The one or more accessories may include one or more odor neutralizing systems. One or more odor neutralizing systems may function to neutralize any malodors that may occur due to waste elimination by an animal. One or more odor neutralizing systems may operate prior to a cleaning cycle, after which waste is disposed within a waste drawer. One or more odor neutralizing systems may be located along and/or in proximity to an entry opening. The one or more odor neutralizing systems may be affixed to, integral with, and/or include one or more mounting brackets, bezel, chamber, bonnet, the like, or any combination thereof. One or more odor neutralizing systems may be removable affixed to a bezel via one or more mounting brackets. One or more odor neutralizing systems may include an automatic sprayer, a neutralizing fluid, a drive unit, a housing, a mounting bracket, a motion sensor, or any combination thereof. An automatic sprayer may include one or more spray nozzles. The one or more spray nozzles may function to spray a neutralizing fluid across an opening of the device, into an ambient environment of the litter device, or both. One or more spray nozzles may be in fluid communication with the neutralizing fluid. The neutralizing fluid may be any suitable air freshener liquid. The liquid may have a composition which reduces airborne bacteria to eliminate offensive odor. Ingredients may include glycol, alcohol, fragrances, and the like. A housing may house the one or more spray nozzles, a drive unit, neutralizing fluid, and motion sensor. A housing may be affixed to and/or integrated with the mounting bracket. The odor neutralizing system may function similar and/or have similar components to the Sense & Spray® by Glade® which is incorporated herein by reference in its entirety. The odor neutralizing system may utilize spray device similar to that in U.S. Pat. No. 8,091,734, which is incorporated herein by reference in its entirety for all purposes.

The chamber includes one or more waste openings. The one or more waste openings may function to allow waste, used litter, or both to transfer from the chamber into the base, waste bin, or both. The waste opening may be at any location in the chamber so that the waste, used litter, or both may transfer from the chamber into a waste bin. The waste opening may be at any location in the chamber that aligns with the waste bin during a cleaning cycle, off-set from the waste bin while in a home position, or both. The waste opening may be formed as an aperture in an upper chamber, lower chamber, or both. For example, the waste opening may be formed as an aperture in the upper chamber such that it resides substantially opposite the waste bin while the chamber is in a home position. The waste opening may have any shape suitable for allowing waste to quickly transfer from the chamber to the waste drawer during a cleaning cycle. The waste opening may have a cross-sectional shape which is substantially circular, ovular, square, rectangular, trapezoidal, triangular, rhombus, the like, or any combination thereof. The waste opening may have a shape which is reciprocal with a cross-sectional shape of the waste bin. The waste opening may be located partially or completely on one side of a longitudinal plane of the device. The longitudinal plane may intersect the rotational axis, vertical plane, horizontal plane, or a combination thereof. The rotational axis, vertical plane, or both may be parallel to, lie within, or both to the longitudinal plane. The horizontal plane may be substantially perpendicular to the longitudinal plane. The longitudinal plane may divide the litter device into side halves. The side halves may each comprise a portion of the bonnet, chamber, and base. The side halves may be substantially symmetrical and/or mirrored about the longitudinal plane. Substantially symmetrical may still allow for certain features to be only located on one side of the device, such as a waste opening. A center of the waste opening may be offset from the longitudinal axis by an angle. A center of the waste opening may be angled from the longitudinal plane by about 0° or more, about 50 or more, about 100 or more, about 15° or more, or even about 20° or more. A center of the waste opening may be angled from the longitudinal plane by about 45° or less, about 35° or less, about 30° or less, or even about 25° or less. The angle may be measured when a chamber is in a home position. The waste opening may be located on one or more sides of a track. The waste opening may be located between an entry opening and a track. The waste opening while the chamber is in a home position, may not overlap with the waste bin. The waste opening, during a cleaning cycle, may substantially align, overlap, or both with a waste bin. The waste opening, during a cleaning cycle, may be rotated about the rotational axis. The waste opening, during a cleaning cycle, may rotate from a home position to an emptying position, a home position, any position therebetween, or a combination thereof. The emptying position may be when the chamber is rotated such that the waste opening is located adjacent to, overlapping with, substantially centered with, or a combination thereof the waste bin. The waste opening, during a cleaning cycle, may rotate by an angle of about 130° or greater, about 145° or greater, about 150° or greater, about 155° or greater, or even about 160° or greater to an emptying position. The waste opening, during a cleaning cycle, may rotate by an angle of about 230° or less, about 220° or less, about 200° or less, or even about 180° or less to an emptying position. The waste opening may rotate a complete revolution (e.g., 360°) from the start of a cleaning cycle to the end of a cleaning cycle. Rotation of the waste opening may occur when a track is rotated. Rotation of a track may rotate the chamber and the waste opening.

The chamber may include a rotation device. The rotation device may function to rotate the chamber about a rotational axis, rotate the chamber during a cleaning cycle, or both. The rotation device may be a track, gear, high friction surface, raised area, toothed area, contact surface area, the like, or a combination thereof. The rotation device may be affixed to, integral with, in rotational communication with, or a combination thereof the chamber. The rotation device may be located on an exterior, interior, or both of the chamber. The rotation device may be a belt, a cog, a sprocket, a toothed assembly, rollers, a wheel, the like, or a combination thereof. The chamber may include a track about at least a portion of an exterior of the chamber. The base may include one or more drive sources in rotational communication with and which drives the rotation device.

The litter device may include a bonnet. The bonnet may function to cover a track, cover a waste opening, provide an aesthetically appealing exterior, protect against one or more pinch points or contact points with one or more moving components, prevent contaminants (e.g., liquid, dust, fur, etc.) from entering into the device (e.g., such as between the track and drive source), or a combination thereof. The bonnet may partially or fully cover a track, waste opening, or both while the chamber is in home position, during a cleaning cycle, in an emptying position, or any combination thereof. The bonnet may be static, mobile, or both relative to the chamber when the chamber rotates. The bonnet being static relative to the chamber may allow for the bonnet to continuously cover the track, waste opening, pinch points, or a combination thereof while the chamber is in motion. The bonnet being static relative to the chamber may provide ease in manufacturing, reliability during use, or both. The bonnet may have any suitable shape and/or size for covering and/or concealing a track, waste opening, or both; being located over and/or about at least a portion of a chamber; or any combination thereof. The bonnet may have a shape substantially reciprocal with the contour of a chamber, upper chamber, lower chamber, or a combination thereof. For example, the bonnet may have a shape which is substantially hemispherical. The bonnet may be substantially solid, continuous, have one or more openings, discontinuous, the like, or any combination thereof. The bonnet may be free of or include one or more openings. The one or more openings may align with a waste opening while the chamber is in a home position. The one or more openings may include a transparent covering. The transparent covering may allow for light to pass through while still physically covering a waste opening. The one or more openings may allow natural light into the chamber interior. The bonnet may be affixed to a base, bezel, litter dispenser, or a combination thereof. The bonnet may be permanently and/or removably affixed to a base, base frame, bezel, litter dispenser, or a combination thereof. The bonnet may be pivotably engaged with the base, base frame, or a combination thereof. The bonnet may be affixed to the base and/or base frame by one or more hinges, fasteners, or both. One or more fasteners may include one or more threaded fasteners (e.g., screw, bolt, nut), interlocking tabs, rivets, pins, the like, or a combination thereof. The bonnet may be affixed to the base and/or base frame by one or more hinges opposite an entry opening. The bonnet may be affixed to the base and/or base frame by one or more interlocking tabs where the bonnet mates with the base and/or base frame. The bonnet may be affixed to the bezel with one or more interlocking tabs where the bonnet mates with the bezel about the entry opening. The bonnet may be attached by one or more conductive fasteners to the bezel, base, base frame, or a combination thereof. One or more conductive fasteners may conduct current from the bezel, base, base frame, or a combination thereof to the bonnet. The flow of current via one or more conductive fasteners may indicate the bonnet is affixed to the base, base frame, and/or bezel. The stop of current flow via the one or more conductive fasteners may indicate the bonnet has been removed from the base, base frame, and/or bezel. One or more cleaning cycles may be prevented from occurring, the chamber may be prevented from rotating, or both when the bonnet is removed from the base, base frame, and/or bezel. The bonnet may include one or more interlock sensors as described in U.S. Pat. No. 8,757,094 and US Patent Application Publication No: 2013/0333625, incorporated herein by reference.

The litter device may eliminate waste during one or more cleaning cycles. A cleaning cycle may function to transfer waste from a chamber to a waste bin, waste drawer, base, the like, or any combination thereof. The cleaning cycle may function to rotate the chamber about a rotational axis. During a cleaning cycle, the chamber may rotate clockwise, counterclockwise, or both. A direction of rotation may be dependent on orientation of a septum, screen, or both.

The litter device includes a base. The base may function to support a chamber, house a waste drawer, house one or more electrical components, or any combination thereof. The base may have any size and shape so that the base may support the chamber, house a waste drawer, and/or house one or more electrical components. The base may rotatably support the chamber. The base may allow the chamber to rotate during one or more cleaning cycles. The base may be configured to rest on a surface. A surface may be any suitable surface for having a litter device resting thereon. The surface may be a floor, table, platform, substantially planar surface, or any combination thereof. The base may include one or more base frames, waste drawers, drawer cavities, chamber supports, steps, electrical components, ports, filters, the like, or any combination thereof.

The litter device includes a waste drawer. The waste drawer may function to collect waste, temporarily store waste, prevent malodors related to waste from exiting the device, or any combination thereof. The waste drawer may have any shape and size that allows the waste drawer to collect and temporarily store waste. The waste drawer may be located within a base, within a drawer cavity, between a chamber support and a bottom of a base, between a bottom of a base and the chamber, or any combination thereof. The waste drawer may be any size and/or shape such that it is able to temporarily collect and store waste. The waste drawer, or portions thereof, may have a three-dimensional shape which is substantially spherical, ovoidal, cylindrical, cuboidal, conical, pyramidical, the like, or any combination thereof. For example, a waste drawer may have a shape which is substantially cuboidal and hollow. The waste drawer may slide within a plane. The waste drawer may be removably located within the base. The waste drawer may be at least partially located within a waste drawer cavity. The plane may be parallel or offset relative to a horizontal plane. The waste drawer may include a waste bin, drawer front, step, handle, or any combination thereof. A drawer front may form all or a portion of a forward-facing surface (e.g., same side as an entry opening) of the base. A drawer front may align with an exterior of a base frame so as to conceal the drawer cavity. A drawer front may have a cross-sectional shape substantially reciprocal with a cross-sectional shape of a drawer opening in the base frame. A reciprocal shape may allow for the drawer cavity by the drawer front to be completely sealed when the waste drawer is located within the drawer cavity. The drawer front may be affixed, integral with, or both to a waste bin. The drawer front may be forward-facing relative to the waste bin.

The litter device may include one or more steps. The one or more steps may allow an animal to comfortably enter and exit the chamber via an opening. The one or more steps may be affixed to a waste drawer. The one or more steps may function as a handle of a waste drawer.

The one or more steps may include a cleaning device. The cleaning device may function to remove litter remaining on feet (e.g., paws) of an animal when they exit the chamber, before completely leaving the litter device, or both. By removing litter from an animal's paws, the cleaning devices prevents litter and other unwanted remnants from an animal's paws being tracked throughout a region surrounding the litter device. The cleaning device may cooperate with one or more grooming portions to remove particles from an animal.

The litter device may include a septum. The septum may function to sort waste from litter, separate used litter from unused litter, or both. The septum may have any size or shape suitable for being located within the chamber to sift through litter during a cleaning cycle. The septum may be a single piece or a plurality of pieces. The septum may include a screen portion, septum portion, hinge, or a combination thereof. The septum may be located within the chamber, affixed to an interior of the chamber (e.g., upper chamber), integral with the chamber, or any combination thereof. The septum may be permanently affixed or removably affixed. The septum may include or more attachment features. The one or more attachment features may be reusable fasteners. The one or more attachment features may include one or more tabs, clips, threaded fasteners, and/or the like. The one or more attachment features may cooperate with features of an interior of the chamber to retain the septum in place. The one or more attachment features may be part of or affixed to a septum portion of the septum. The septum may be located substantially across from a lower chamber, liner, or both. The septum may be aligned with a waste opening, partially through a waste opening, or both of the upper chamber. The septum portion may include a septum opening. The septum opening may be aligned, co-axial, centered, and/or even reside within a waste opening. The septum opening may be formed in a protrusion of a septum portion. A protrusion may create a funnel to guide waste through the waste opening into the waste drawer. The septum opening may be the hollow portion of the protrusion. The protrusion may be referred to as a neck. The protrusion (e.g., neck) may be located within the waste opening. The septum portion may be statically affixed to an interior of the chamber, such as the upper chamber. Thus, the septum portion may rotate with and remain fixed to the chamber during rotation. The septum may include a hinge. The hinge may connect a septum portion to a screen portion. The hinge may allow a septum portion, screen portion, or both the ability to move relative to the other during one or more cleaning cycles, rotation of a chamber, or both. The hinge may be affixed to, integral with, adjacent to, located between, or a combination thereof to the septum portion and screen portion. The hinge may be a multi-component hinge (e.g., butt hinge) or a single component hinge. A single component hinge may be a living hinge. The hinge may be made of any material which allows movement of the screen portion, septum portion, or both relative to the other. Movement may be during the forming process of the septum, before and/or during installation of the septum into the chamber, rotation of the chamber during a cleaning cycle, or any combination thereof. The hinge may also be formed such that it allows the screen geometry to be formed in the line of draw of the septum for molding. The hinge may be made of the same material as the screen portion, septum portion, or both. The hinge may allow for the screen portion to be angled relative to the septum portion. The hinge may allow for the septum to be installed and contour to a shape substantially reciprocal to an interior of the chamber. The hinge may impart flexibility to the screen portion relative to the septum portion. The screen portion, in a home position of the chamber, natural resting portion of the septum outside of the chamber, or both may be at an acute, perpendicular, or obtuse angle relative to the septum portion. The screen portion may be at an angle relative to the septum portion of about 90 degrees or greater, about 120 degrees or greater, about 140 degrees or greater, or even about 150 degrees or greater. The screen portion may be at an angle relative to the septum portion of about 180 degrees or less, about 170 degrees or less, or even about 160 degrees or less. The angle may be measured as the angle between the surfaces facing toward the litter bed, lower chamber, base, interior of the chamber, or any combination thereof. The screen portion may be free of attachment to the chamber. The screen portion may only be affixed to the chamber via the septum portion. The screen portion may move (e.g., swing) and/or remain substantially static relative to the hinge, septum portion, or both during a cleaning cycle, rotation of the chamber, or both. The screen portion may include one or more openings, such as a plurality of openings. The screen portion may be ribbed, grated, corrugated, slotted, meshed, the like, or any combination thereof. The plurality of openings may be sized such as to allow for unused (e.g., clean) litter to pass therethrough while waste, used litter, clumps, lumps, and/or the like are prevented from passing through. The plurality of openings in the screen portion may allow for litter to be sifted through during a cleaning cycle so as to separate waste from the unused litter. The screen portion may cooperation with a diverter. A diverter may function to control dust during a cleaning cycle, ensure litter passes underneath the screen portion when returning to a home position, push a screen upwards during a cleaning cycle (such as while returning to a home position), or any combination thereof. A diverter may be located between the screen portion and an interior of the chamber. The diverter may lay flat against the chamber wall while the chamber is rotating from a home position to an emptying. The diverter may be lifted away from the chamber wall while the chamber is rotating from an emptying position back to a home position. By moving away from the chamber wall, the diverter may apply force on the screen portion, moving the screen portion also away from the chamber wall. The septum may be comprised of a suitable material. The material may be non-stick; liquid impenetrable; resistant to damage, penetration, scent absorption, stain, or a combination thereof by litter, waste, liquids, solids, semi-solids, or a combination thereof. The septum material may be rubber, polymeric material, a synthetic material, a natural material, or any or a combination thereof. The septum may be made of the same material or differing materials. For example, the living hinge, septum portion, and screen portion may be comprised of the same one or more materials.

The litter device may include one or more seals. One or more seals may function to prevent odor from transferring from a base, waste drawer, or both to the chamber, about the chamber, an exterior of the litter device, or any combination thereof. The one or more seals may include any seals capable of forming a sealing a junction between two or more surfaces to prevent malodors, liquid, waste, and/or litter from passing therethrough. The one or more seals may include one or more mechanical seals. The one or more mechanical seals may include one or more adhesives, sealants, gaskets, compressing fittings, plugs, the like, or any combination thereof. One or more gaskets may include one or more flange gaskets, O-ring gaskets, brush seals, the like, or any combination thereof. The one or more seals may be located between one or more mating surfaces, at a junction of two or more surfaces, or both. The one or more seals may be part of the chamber, base, litter dispenser, ventilation system, the like, or any combination thereof. The one or more seals may be located between mating surfaces of a waste drawer and base. The one or more seals may be located between a mating surface of a waste bin and a chamber support. The one or more mating surfaces may be about a perimeter of the waste bin, opening of the chamber support, or both where the waste bin contacts the chamber support. One or more seals may be located between a chamber and a base. One or more seals may seal a gap between a chamber and a chamber support. One or more seals may be located between a base frame and a waste drawer. One or more seals may be located where a waste drawer mates with a drawer opening. One or more seals may be located about a perimeter of the drawer opening, a reciprocal portion of the waste drawer, or both. One or more seals may still allow movement for one or more components while preventing leakage while in a static position. The one or more seals may allow for the waste drawer to be removed from a base, chamber to rotate, or both. The one or more seals may be comprised of one or more seal materials. One or more seal materials may include rubber, silicone, metal, paper, cork, felt, neoprene, nitrile rubber, fiberglass, polytetrafluoroethylene (PTFE), plastic polymers such as polychlorotrifluoroethylene, the like, or a combination thereof.

The litter device may include a drive mechanism. The drive mechanism may function to rotate a chamber, drive a track, or both; produce movement of a cleaning cycle; or a combination thereof. The drive mechanism may be any suitable mechanism for rotating and/or engaging with a chamber, track, or both. The drive mechanism may be engaged, in rotational communication, or both with the track. The drive mechanism may include one or more cogs, pulleys, sprockets, gears, belts, direct drives, motors, drive shafts, the like, or any combination thereof.

The litter device may include one or more odor neutralizers. The one or more odor neutralizers may function to reduce and/or eliminate malodors, pathogens, or both from within the litter device. The one or more odor neutralizers may be manually and/or automatically operated. The one or more odor neutralizers may include may be automatically initiated based upon sensed air quality, completion of a cleaning cycle, sensing of an animal leaving the litter device, or any combination thereof. The one or more odor neutralizers may be affixed to a bezel, bonnet, base, step, chamber, exterior storage unit, the like, or any combination thereof. The one or more odor neutralizers may be part of or separate from an odor neutralizing system. The one or more odor neutralizers may be affixed to an interior and/or exterior of the litter device or any of its components. The one or more odor neutralizers may be permanently or removably affixed to the letter device. The one or more odor neutralizers may emit a spray upon being initiated. The one or more odor neutralizers may comprise one or more ingredients. The ingredients may include: nitrogen, water, cyclodextrin, alcohol, ethyl alcohol, hydrogenated castor oil, mineral oil, dialkyl sodium sulfosuccinate, sodium citrate, sodium borate, citric acid, sodium polyacrylate, benzisothiazolinone, butane, propane, fragrance(s), zeolite, charcoal, enzymatic bacteria (e.g., amylase, lipase, protease), the like, or any combination thereof.

The litter device may include one or more decorative coverings. The one or more decorative coverings may function to change the exterior appearance of the litter device. The one or more decorative coverings may function to cover a bonnet, base, bezel, litter dispenser, waste drawer, the like, or any combination thereof. The one or more decorative coverings may be formed to have a shape reciprocal with that of the bonnet, base, bezel, litter dispenser, waste drawer, the like, or any combination thereof. The one or more decorative coverings may be provided in a substantially planar (e.g., flat) manner, or substantially resembling the shape of one or more components of the litter device. The one or more decorative coverings may be applied with a permanent adhesive, temporary adhesive, static electricity (e.g., static cling), form fitting, the like, or a combination thereof. The one or more decorative coverings may include a pattern (design), be solid, or both. The one or more decorative coverings may be permanently affixed, removably affixed, or both to the litter device. The one or more decorative coverings may be reusable, single use, washable, or any combination thereof.

The litter device may cooperate with one or more external storage units. The one or more external storage units may function to conceal the litter device, provide for a filtering system, provide additional storage, the like, or any combination thereof. The one or more external storage units may include any shape and/or configuration useful for retaining a litter device. The one or more external storage units may include one or more walls, entry openings, doors, vents, filtering systems, shelves, the like, or any combination thereof. One or more walls may form a hollow interior. The one or more external storage units may have an interior space of sufficient area and overall volume to fit a litter device therein. One or more entry openings may be formed in one or more walls. One or more entry openings may allow for an animal to enter into the interior of the external storage unit and access the litter device. One or more doors may be provided in place of one or more walls. One or more doors may allow for easy access to the litter device by an individual (e.g., pet owner). One or more vents may be formed in one or more walls and/or doors. The one or more vents may allow for fresh, ambient air to enter and/or exit the external storage unit. One or more shelves may be provided within or outside of the external storage unit. The one or more shelves may provide for additional storage. One or more filtering systems may be provided within or outside of the external storage unit. One or more filtering systems may be located adjacent to or in proximity to one or more walls. The one or more external storage units may resemble a cabinet, buffet, buffet and hutch, bench, wardrobe, or the like.

The automated litter device may include one or more sensors. The one or more sensors may function to detect one or more conditions of the device. The one or more sensors may be located in any one or more portions of the litter device which may allow for a sensor to detect the presence and/or absence of one or more conditions of the one or more components. One or more sensors may be located adjacent to an entry opening, in proximity and/or affixed to a drive source, near one or more pinch points, part of a bonnet, part of a bezel, part of base, within or affixed to the chamber, or any combination thereof. One or more sensors may be located within or on a bezel. One or more sensors may be located on an upper portion of the bezel. One or more sensors may be located adjacent to an entry opening, opposite the base, a same side of a chamber as a waste opening, an opposite side of a chamber as a waste opening, same side of a chamber as an upper chamber, a bottom of a base, or any combination thereof. For example, one or more sensors may be located on a sensor board within a bezel. The angle of the opening plane relative to a vertical plane may result in one or more sensors being located over the litter, having a line of sight into the litter, over a hollow interior of the chamber, having a line of sight into a hollow interior, over the waste drawer opening, having a line of sight into the waste drawer (e.g., via the waste opening), or any combination thereof. One or more sensors may be located on or near one or more legs and/or feet of a base. For example, the one or more legs and/or feet of a base may include one or more mass and/or weight sensors. on the one or more conditions sensed, one or more sensors may transit one or more signals to one or more controllers, processors, communication modules, computing devices, or any combination thereof. The one or more sensors may be a single sensor or a plurality of sensors. One or more sensors may include 1 or more, 2 or more, or even 3 or more sensors. One or more sensors may include 15 or less, 12 or less, 10 or less, 9 or less, 8 or less, 7 or less, or even 5 or less sensors.

One or more sensors may be adapted to detect one or more conditions related to: a mass, change in mass, or both of the litter device; a presence of litter, the amount of litter, or both; a presence of waste, a level of waste, or both; the presence of light, light above, at, and/or below a lumen level, or a combination thereof; a connection between two or more components of the device (e.g., support base and bonnet); the presence of one or more pinch conditions; one or more positions of a chamber; an operating condition of a motor; presence of an animal within one or more portions of the litter device; or any combination thereof. One or more sensors may be adapted to sense the presence of an animal within a chamber, the presence of waste within a waste bin in a base, a level of litter in a chamber, a position of the chamber relative to the base, or any combination thereof. One or more sensors may be adapted to sense the presence of an animal within the litter device and within a portion other than the chamber. One or more sensors may be able to sense presence, measure distance, measure a displacement, detection a position relative to one or more components of the automated litter device, or any combination thereof.

One or more sensors may include one or more mass sensors, capacitive sensors, infrared sensors, laser sensors, ultrasonic sensors, membrane sensors, radio frequency (RF) admittance sensors, conductive sensors, optical interface sensors, microwave sensors, the like, or combination thereof. One or more laser sensors may include one or more time-of-flight sensors. One or more laser sensors may include one or more cone laser sensors. One or more cone laser sensors may include one or more wide cone laser sensors, narrow cone laser sensors, or both. The one or more sensors may include one or more waste sensors (e.g., indicator), presence sensors, light sensors, interlock sensors, pinch detectors, position sensors, motor sensors (e.g., one or more laser sensors, distance sensors,) or any combination thereof. One or more sensors may provide the function of multiple sensors. For example, one or more waste sensors may also be one or more presence sensors. One or more exemplary sensors may be discussed in U.S. Pat. No. 8,757,094; US Patent Application Publication Nos. 2013/0333625 and 2019/0364840; and PCT Patent Application No.: PCT/US2020/029776 (published as PCT Publication No. WO 2020/219849A1), all of which are incorporated herein by reference in their entirety for all purposes.

Cleaning Cycle

The litter device may complete one or more cleaning cycles. A cleaning cycle may function to transfer waste from within a chamber into a base, waste drawer, or combination thereof. A cleaning cycle may function to sort clean litter (e.g., unused litter) from waste, used litter, clumps, lumps, or any combination thereof. A cleaning cycle may be initiated after one or more presence sensors sense an animal has exited the chamber, waste has been deposited within the chamber, a user has initiated a cleaning cycle, or any combination thereof. A cleaning cycle may begin with rotation of a chamber. A chamber may be driven by a track, drive mechanism, or both. A chamber may be driven by a track affixed thereto. The track may be driven by a drive mechanism. The chamber may rotate clockwise, counter-clockwise, or both. Rotation direction may be determined by the location of the septum, the screen portion relative to the septum portion, a waste opening, or a combination thereof. During a cleaning cycle, the chamber may rotate from a home position to an emptying position, from an emptying position to a home position, from an emptying position to a leveling position, from a home position to a leveling position, from a leveling position to a home position, or any combination thereof. For example, a cleaning cycle may comprise rotation of the chamber from a home position to an emptying position, from the emptying position to a leveling position, and from the leveling position back to the home position. Rotation from the emptying position to the leveling position may include passing the home position. The home position may be a resting position of the chamber suitable for an animal to use the litter device. The emptying position may allow for waste to transfer to a waste drawer. In the emptying position the waste opening may be aligned with the waste drawer. The leveling position may allow for litter to level itself along a bottom chamber, liner, or both before returning to a home position.

Filter System

The present teachings also relate to a filtering system. The filtering system may function to prevent, reduce, neutralize, and/or even eliminate odor from air passing therethrough from the litter device. The filter system may function not prevent and/or reduce dust particles (e.g., from litter) from exiting the litter device. The filtering system may have any size, shape, and/or configuration for reducing or even eliminating malodor associated with animal waste, dust created from a litter device, or both. The filtering system may be an active system, passive system, or both. An active system may be one that moves air to reduce or eliminate odor, reduce and/or prevent dust particles from exiting the chamber, or both. A passive system may be one that absorbs malodor. The reduction of malodor may occur through eliminating bacteria causing the odor, filtering the odor, cooling the air to reduce the odor, or any combination thereof. The reduction of dust particles may occur through directing the flow of airborne particles toward an interior of the litter device. The filtering system may include one or more air circulation devices, filters, light treatment devices, heat exchange devices, the like, or a combination thereof.

One or more light treatment devices may be any energy source suitable for killing bacteria waste which causes a malodor. A suitable light treatment device may include one or more ultraviolet lights.

One or more heat exchange devices may function to change an air temperature of air within a filtering system, such as reducing the air temperature. Cooling the air may suppress growth of bacteria associated with malodors. One or more heat exchange devices may include one or more thermoelectric devices (TED). One or more thermoelectric devices may include one or more Peltier devices.

One or more filters may include one or more physical filters. One or more physical filters may be any filter suitable for absorbing malodor from air as the air passes through the filter. One or more physical filters may be any filter suitable for catching particles from the litter. The one or more physical filters may include one or more pre-filters, allergen filters, deodorization filters, pathogen filters, the like, or any combination thereof. One or more pre-filters may function to catch larger particles. Larger particles may include litter particles, finer dust particles from the litter, smaller waste particles that may be smaller than the screen openings of the septum, the like, or any combination thereof. One or more allergen filters may function to absorb and decompose allergens. Allergens may include one or more proteins. These proteins may be part of pet dander and/or waste matter. The one or more allergen filters may function by destroying the proteins. The one or more deodorization filters may function to neutralize and/or remove malodors in the air passing therethrough. The one or more pathogen filters may function to prevent passage of pathogens. The pathogens may include bacteria and/or viruses. The one or more pathogen filters may prevent pathogens larger than 0.3 µm from passing therethrough. The one or more pathogen filters may include one or more HEPA filters. One or more physical filters may include zeolite, charcoal, nylon wool, synthetic wool, silica gel, baking powder, the like, or a combination thereof. The filtering system may be part of the litter device, affixed to the litter device, within the litter device, part of an exterior of the litter device, or any combination thereof.

The litter device may include and/or be in communication with one or more filtering systems. A filtering system may be located between a chamber and a base, adjacent to a base, within the base, part of the chamber, outside of the base, outside of the chamber, part of the bezel, adjacent to the bezel, part of a step, part of an exterior storage unit, or any combination thereof. The filtering system may be affixed to the chamber, the bezel, the base, an exterior storage unit, or any combination thereof. The filtering system may be located generally opposite a waste opening of a chamber, adjacent to a waste bin, opposite a waste drawer opening, outside of the base, adjacent to an exterior wall of a base frame, near the rotational axis, adjacent to and/or surrounding an entry opening, or any combination thereof. The filtering system may be free of, may include, be part of, or combination thereof a ventilation system. The filtering system may include one or more housings, physical filters, caps, ventilation systems, ducts, the like, or any combination thereof.

The filtering system may include one or more housings. The one or more housings may function to house one or more components of the filtering system, be affixed to one or more components of the filtering system, be in fluid communication with the waste cavity, waste drawer, chamber interior, or a combination thereof. The housing may have any size, shape, and or configuration suitable for housing one or more components of the filtering system. The housing may be located within the litter device, outside of the litter device, affixed to the litter device, part of a step, part of an exterior storage unit, or any combination thereof. The housing may be affixed to a chamber, base, bezel, one or more ducts, exterior storage unit, or any combination thereof. The housing may be part of or separate from the chamber, base, bezel, exterior storage unit, or combination thereof. The housing may be formed in the chamber, bezel, exterior storage unit, base, or any combination thereof. The housing may be formed as a space in the bezel, such as an interior space of the bezel. The housing may be formed as part of an exterior storage unit. The housing may be formed as an indentation within an exterior wall of the chamber. The housing may be referred to as a filter cavity. The housing may be formed in a lower chamber. The housing may be located adjacent to a waste drawer, waste bin, opening of a chamber support, or any combination thereof. While the chamber is in a home position, the housing may be in fluid communication with the waste bin so as to allow the malodors to flow from the waste bin to the housing. The indentation may provide a hollow void to store one or more physical filters. A physical filter may have a shape substantially reciprocal with the hollow void, filter cavity, contour of a portion of the chamber, or any combination thereof. The housing may include a cap. The cap may close off the indentation and retain the filter within the housing. The cap may include a plurality of openings. The plurality of openings may allow for malodors from a waste drawer to enter into the housing and be absorbed by one or more physical filters. The housing may be formed outside of the litter device. The housing may be any suitable shape for being located beside and/or adjacent to the base of the litter device. The housing may be in fluid communication with the base by one or more ducts.

The litter device may be affixed to and/or include a ventilation system. The ventilation system may function to circulate air through one or more filtering systems, filters, or both. The ventilation system may have any size, shape, and/or configuration for ventilating air from a waste drawer, base, chamber, exterior of the device, or any combination thereof; directing air toward a filtering system; directing air from a filtering system toward a litter device; directing air from a litter device toward an exterior environment; or any combination thereof. The ventilation system may include one or more ducts, inflows, outflows, ports, air circulation devices, filter systems, housings, or any combination thereof. The one or more air circulation devices may be located within, separate from, or both the housing of the filtering system. The one or more air circulation devices may include one or more fans, air pumps, the like, or any combination thereof. The one or more air circulation devices may move air from, to, or both one or more ducts. The one or more air circulation devices may be located in one or more exterior walls, within an interior, or both of a housing, duct, bezel, exterior storage unit, or any combination thereof. The ventilation system may be connected to a part of a litter device by the one or more ducts. The ventilation system may be one or more ducts.

The ventilation system may include one or more ducts. The one or more ducts may function to provide a passageway for and/or guide air to and/or from the litter device, to and/or from a filtering system, or any combination thereof. The one or more ducts may provide an outflow, inflow, or both. The one or more ducts may have any shape, size, and/or configuration to be affixed to a base, filtering system, housing, the like, or a combination thereof. The one or more ducts may include a single duct or a plurality of ducts. The one or more ducts may include an inflow, outflow, or both. An outflow may receive air from a base, waste drawer, or both. An outflow may deliver air into a housing, filtering system, an exterior environment, or a combination thereof. An inflow may receive air from a housing, filtering system, or both. An inflow may deliver air into a base, waste drawer, an exterior environment, or any combination thereof. The one or more ducts may be in fluid communication with the base, waste drawer, or both via one or more ports. A duct may be connected to a base via one or more ports. A duct may be located within, affixed to, or both a port. The one or more ducts may provide a closed loop ventilation system, an open loop ventilation system, or both. In a closed loop ventilation system, air is continuously circulated internal to the filtering system and litter device. In an exemplary closed loop ventilation system, air is circulated from the base, waste drawer, or both to an outflow duct; from the outflow duct to a housing for filtering; from a housing to an inflow duct; and from the inflow duct to the waste drawer. In an open loop ventilation system, air is delivered to an exterior environment, the ventilation system may not recirculate air into the litter device, or both. An exterior environment may be any environment physically outside of the litter device (e.g., ambient environment), the outdoors, or both. To allow for ventilation to the outdoors, one or more ducts may connect to one or more window openings, door openings, or even vent openings of a facility, such as a residential home. An open loop ventilation system may or may not include a filtering system. An open loop ventilation system may include a filtering system such that malodors are not released into an outdoor or ambient environment. In an exemplary open loop ventilation system, air moves from the base, waste drawer, or both toward to an outflow duct; from the outflow duct to a housing for filtering; from a housing to an inflow duct; and from the inflow duct to an ambient or outdoor environment.

Litter Dispenser

The present teachings further relate to a litter dispenser. A litter dispenser may function to store clean, unused litter; refill a litter device, a chamber, or both with clean and unused litter; extend the usability of a litter device without human intervention; or any combination thereof. The litter dispenser may have any size, shape, and/or configuration to be in fluid communication with an interior of a chamber; affixed to a litter device, base, bonnet, chamber, or any combination thereof; have the ability to transfer a portion of litter stored therein into a chamber; have the ability to store litter; or any combination thereof. The litter device may include, be affixed to, or be free of a litter dispenser. The litter dispenser may be located generally opposite an entry opening. By being opposite the entry opening, the litter dispenser may not interfere with entry and exit by an animal, functionality with a septum and/or liner, or a combination thereof. The litter dispenser may be particularly useful in extending the usability of a litter device without human intervention. For example, a waste drawer may have a waste storage capacity greater than the litter capacity in the chamber. Capacity may be measured in volume, usage frequency by an animal, or even days. As during a cleaning cycle, used litter is transferred into the waste drawer along with animal waste, over time the usable litter may be depleted, fall below a desired level, or both. If the usable litter level falls below a predetermined volume within the chamber, it may become too shallow. Too shallow of litter may cause an animal to not be interested in the litter box. Too shallow of litter may cause a higher portion of waste to come into direct contact with an interior surface of the chamber, liner, or both. Additionally, the usable litter in the chamber may be depleted before the waste drawer is full. Traditionally, a human would have to intervene and refill the chamber with fresh litter for continued use of the litter device by an animal. The litter dispenser may be particularly advantageous in reducing human intervention with the litter device and providing a consistent volume of litter within the chamber. The litter dispenser may automatically deliver clean, unused litter into the chamber. The litter dispenser may deliver litter into the chamber once the litter within the chamber reaches a certain quantity (e.g., volume, height, etc.). The level of litter within the chamber may be sensed by one or more sensors. For example, one or more presence sensors, waste sensors, or both may sense the quantity of litter within the chamber. The litter stored within the litter dispenser may be any kind of litter suitable for use with the litter device. The litter dispenser may include a hopper, lid, dispenser housing, dispensing device, the like, or any combination thereof. A suitable litter dispenser is disclosed in PCT Patent Application No.: PCT/US2020/029776 (published as PCT Publication No. WO 2020/219849A1), incorporated herein by reference in its entirety for all purposes.

Illustrative Examples

Any of the features described herein may be combined or used in lieu of one or more features described in U.S. Pat. Nos. 8,757,094 and 9,433,185, and US Patent Application Publication Nos. 2013/0333625 and 2019/0364840, which are incorporated by reference herein in their entirety for all purposes. Any feature as illustrated herein may be combined with another feature. For example, multiple accessories 130 may be assembled to a single bezel 24. As another example, a litter device having a filtering system 110 may also include one or more accessories 130 mounted to a bezel 24.

FIG. 1 illustrates a litter device 1. The device 1 includes a chamber 10 and a base 12. Located within the chamber 10 is litter 5. The chamber 10 is supported by the base 12. The chamber 10 is rotatable relative to the base 12. The base 12 may comprise one or more components which assist in rotation of the chamber 10. The chamber 10 is at least partially covered by a bonnet 14. The bonnet 14 is attached to the base 12. The chamber 10 is also rotatable relative to the bonnet 14 (e.g., the bonnet 14 may remain static while the chamber 10 rotates). The base 12 includes a waste drawer 16. Upon rotation of the chamber 10, waste within the chamber 10 may be transferred from within the chamber 10 to the waste drawer 16. The waste drawer 16 includes a step 18. The step 18 may include a cleaning device 20. The device 1 includes an opening 22. The opening 22 may allow for an animal to enter and exit the chamber 10. The animal may use the step 18 to facilitate entering and exiting the chamber 10. The device 1 also includes a bezel 24. The bezel 24 is located about the opening 22.

Figure 26:
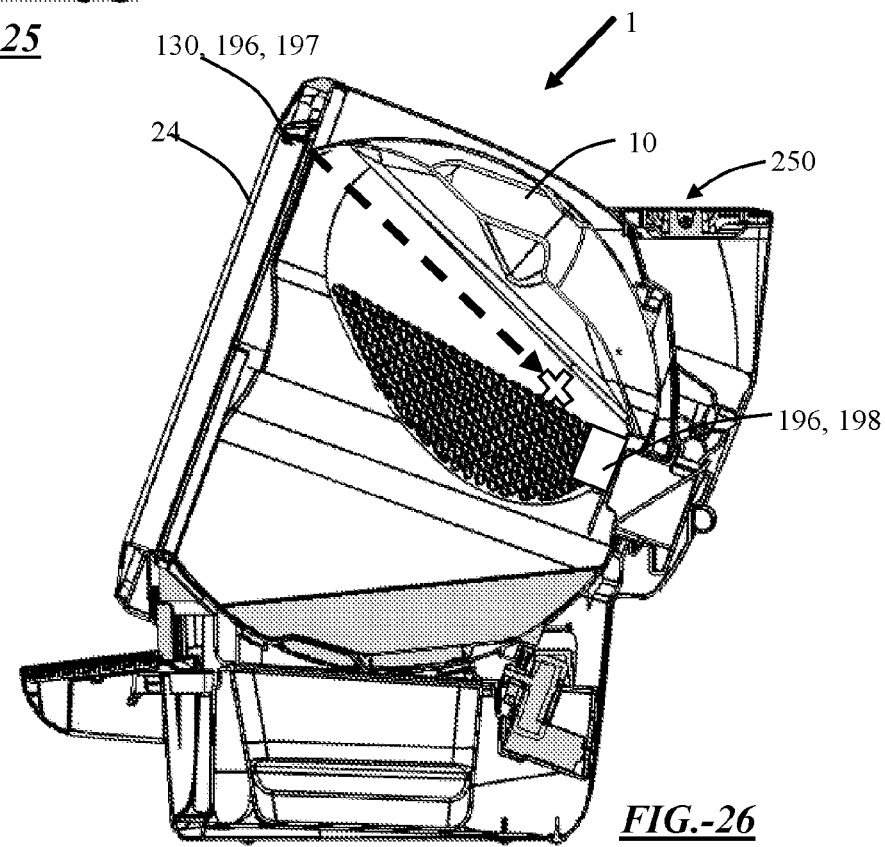
FIG. 26 is a cross-section view of a litter device along section A-A of FIG. 2.
Figure 36:
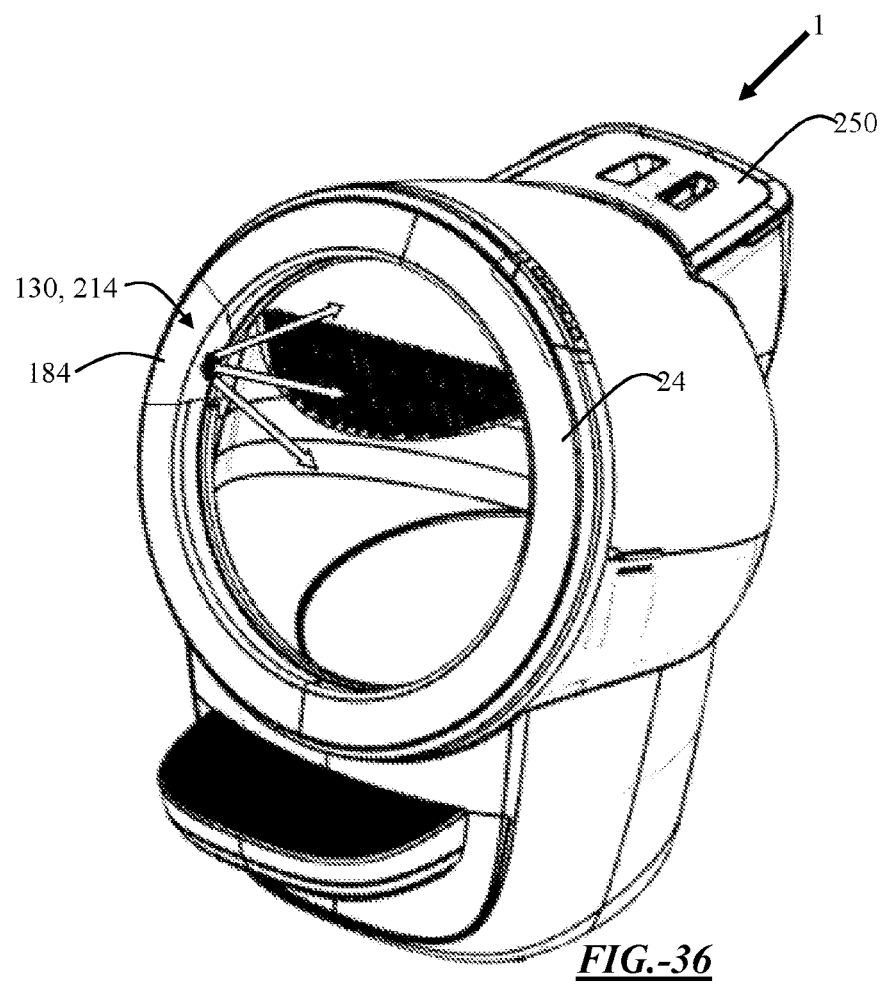
FIG. 36 illustrates a perspective view of a litter device.

The litter device 1 may include a litter dispenser 250 (such as illustrated in at least FIGS. 23, 26, and 36).

FIG. 2 illustrates a litter device 1. The device 1 includes a chamber 10. A bonnet 14 is located around a portion of the chamber 10. An opening 22 is formed in the chamber 10. Inside the chamber 10 is a septum 32. A bezel 24 is located about the opening 22. An outer bezel 46 is the portion of the bezel 24 visible from the exterior. The bezel 24 is affixed to the base 12 and to the bonnet 14. Affixed to the bezel 24 is an accessory 130. As shown, the accessory 130 is a litter guard. The base includes a base frame 68. Located within and removable from the base frame 68 is a waste drawer 16. The waste drawer 16 includes a step 18.

FIG. 3 illustrates a litter device 1. The litter device 1 includes a bonnet 14. A bonnet 14 covers an upper chamber 26. The upper chamber 26 is part of a chamber 10. The chamber includes an opening 22. The device 1 includes a step 18. The step 18 may allow for an animal to comfortably enter and exit from the chamber 10 via the opening 22. The step 18 includes a cleaning device 20.

Figure 5:
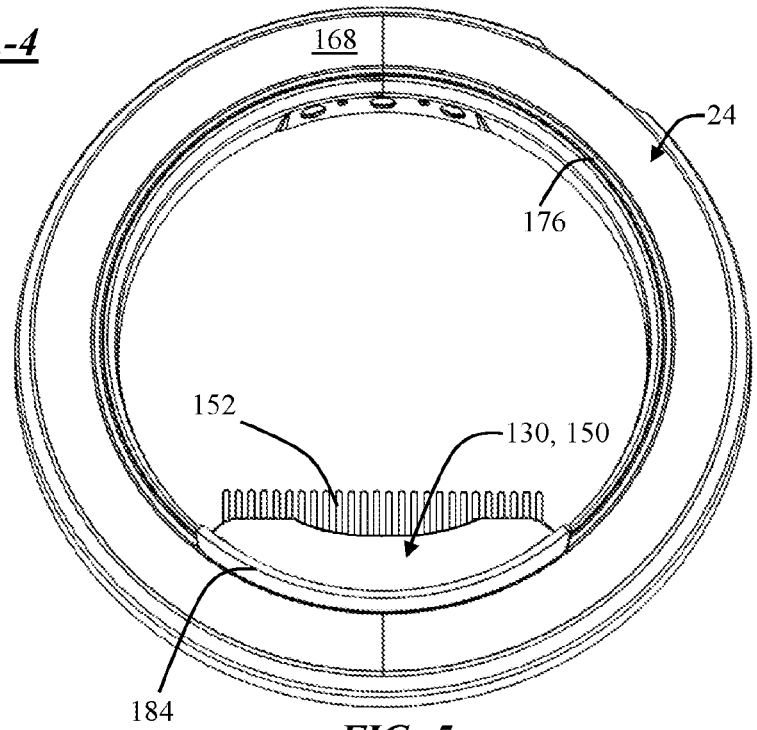
FIG. 5 is a front view of a bezel and accessory of a litter device.

FIGS. 4 and 5 illustrate a bezel 24. The bezel 24 includes a front surface 168. The front surface 168 includes a groove 176 formed therein. Affixed to the bezel 24 is an accessory 130. The accessory 130 is a litter guard 150. The litter guard 150 is removably affixed to the bezel 24 via a mounting bracket 184. As shown in FIG. 5, the litter guard 150 may include a grooming portion 152.

Figure 6:
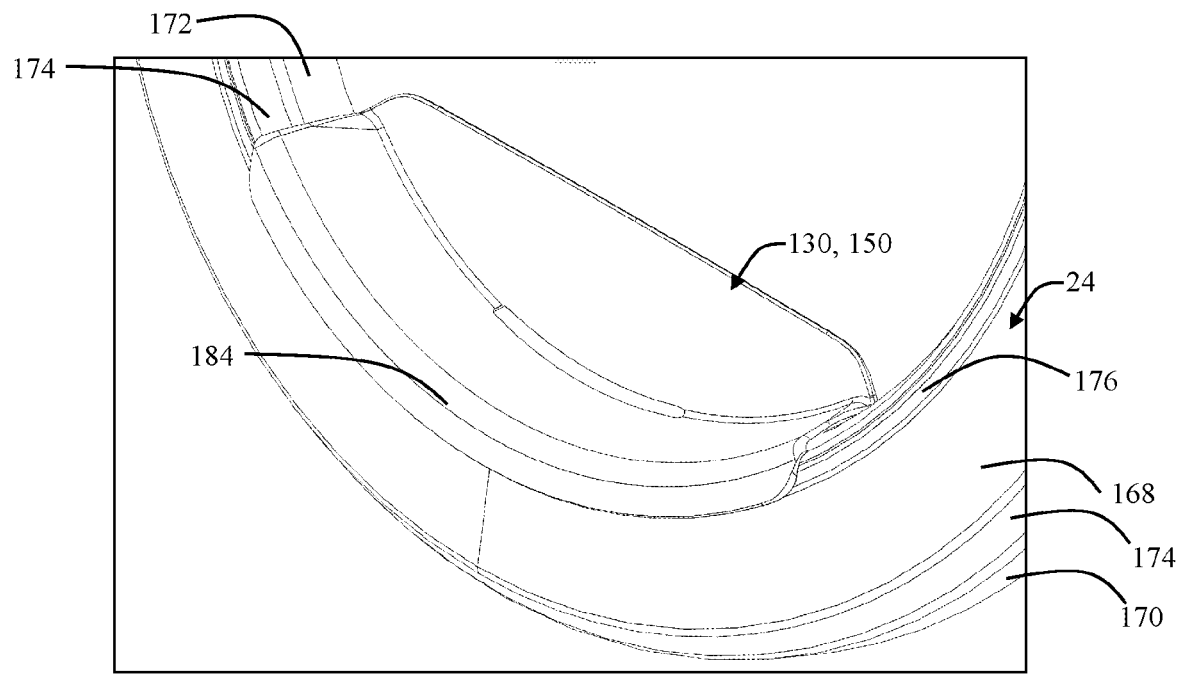
FIG. 6 is a perspective view of a portion of a bezel and accessory.

FIG. 6 illustrates a close-up view of an accessory 130 affixed to a bezel 24. The accessory 130 includes a mounting bracket 184. The bezel 24 includes a front surface 168. Extending from and about the outer periphery of the front surface 168 is an outer flange 170. The outer flange 170 includes a bevel 174. Extending from and about the inner periphery of the front surface 168 is an inner flange 172. The inner flange 172 includes a bevel 174. Between the inner flange 172 and the front surface 168 is a groove 176. The groove 176 is located between the bevel 174 and the front surface 168.

Figure 7:
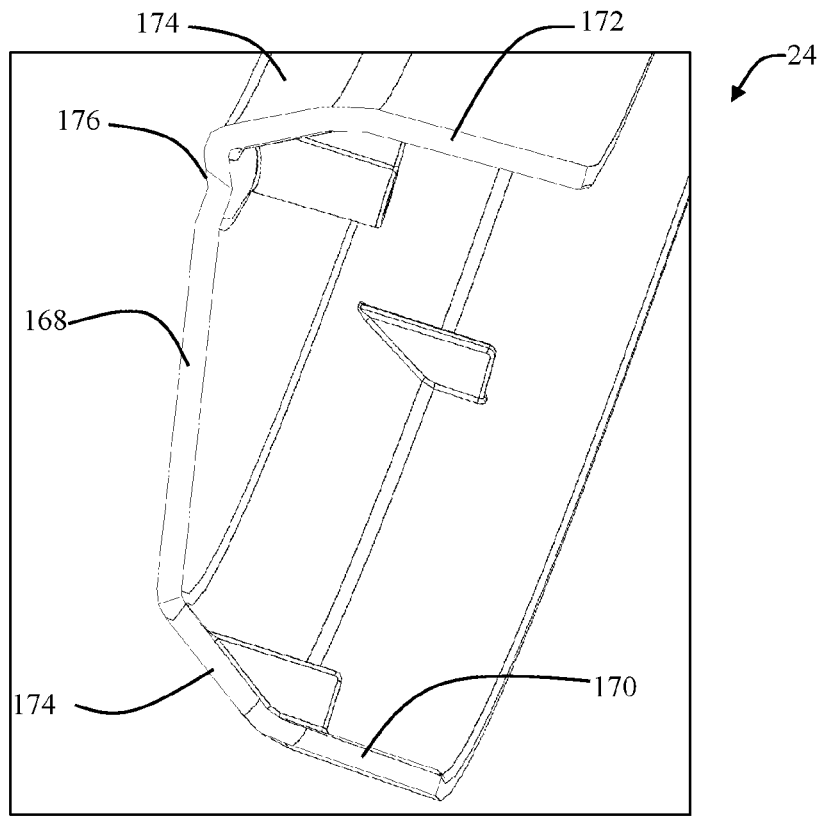
FIG. 7 is a cross-section view of a portion of a bezel section B-B as shown in FIG. 4
Figure 8:
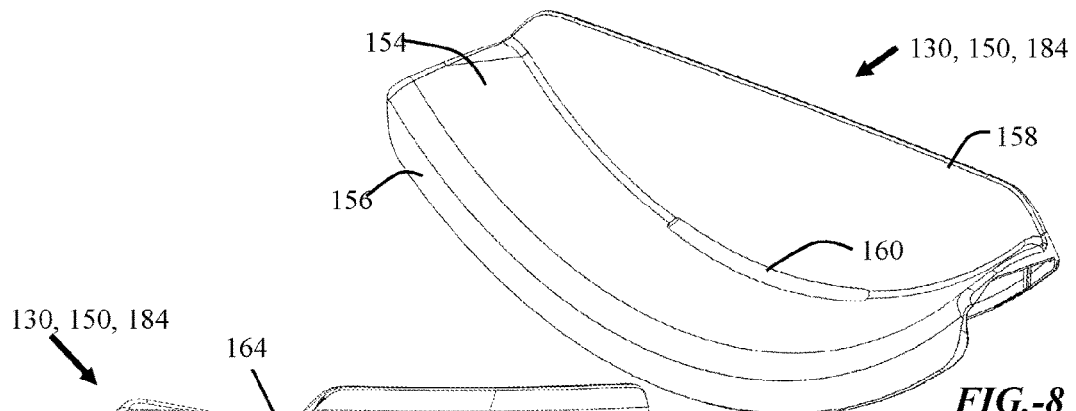
FIG. 8 is a front perspective view of an accessory for a litter device.
Figure 9:
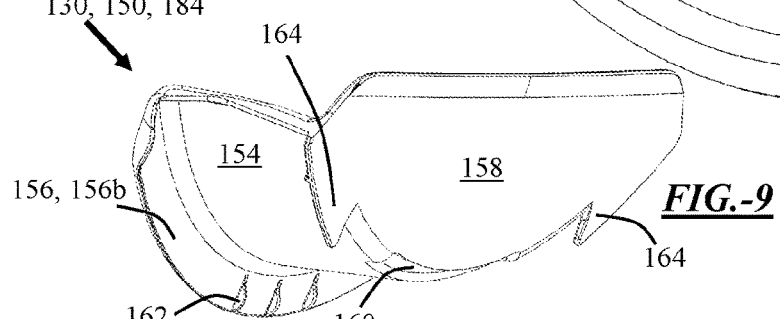
FIG. 9 is a rear perspective view of an accessory for a litter device.

FIG. 7 illustrates a cross-section of a portion of a bezel 24. The cross-section is taken along section B-B as shown in FIG. 4. The bezel 24 includes a front surface 168. Formed in the front surface 168 is a groove 176. The bezel 24 includes an outer flange 170 and an inner flange 172. The front surface 168 transitions to the outer flange 170 and the inner flange 172 via bevels 174.

FIGS. 8-12 illustrate an accessory 130. The accessory 130 is shown as a litter guard 150. The accessory 130 includes a mounting bracket 184. The accessory 130 includes a base member 154. Projecting downward from the base member 154 is a front flange 156. Projecting upward from the base member 154 is a rear wall 158. The rear wall 158 is opposite the front flange 156. The accessory 130 includes a through opening 160. The through opening 160 is formed between the base member 154 and the rear wall 158. The front flange 156 includes a plurality of retention tabs 162. The retention tabs 162 are formed on a rear surface 156b of the front flange 156. The rear surface 156b is opposite the front surface 156a of the front flange 156. Projecting from the base member 154 are rear flanges 164. The rear flanges 164 extend from the rear wall 158.

Figure 10:
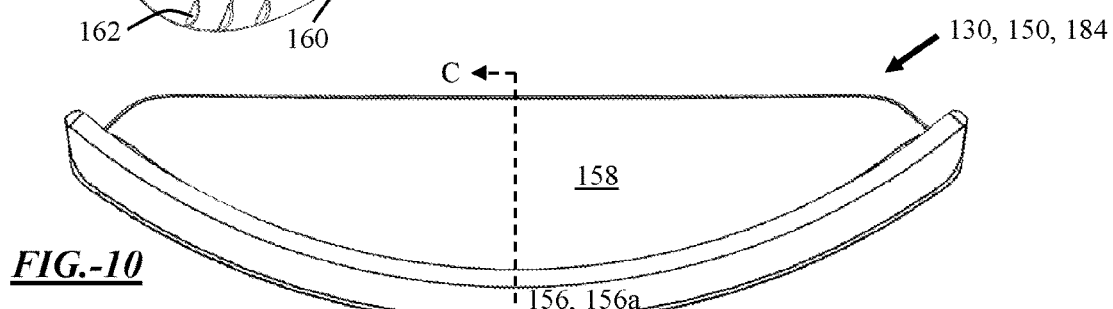
FIG. 10 is a front view of an accessory for a litter device.
Figure 11:
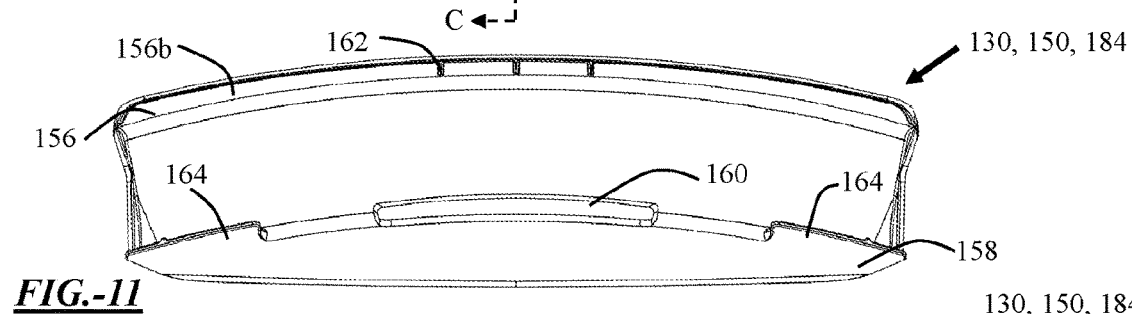
FIG. 11 is a bottom view of an accessory for a litter device.
Figure 12:
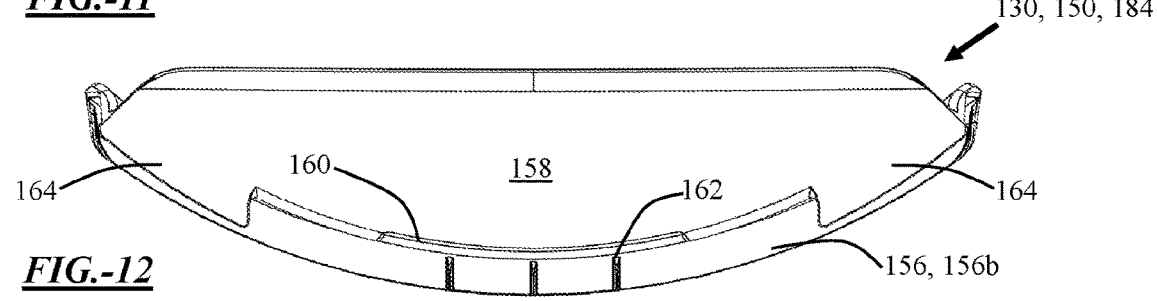
FIG. 12 is a rear view of an accessory for a litter device.

FIGS. 13-14 illustrate an accessory 130. FIG. 14 is a cross-section of the accessory 130 taken along section C-C as shown in FIG. 10. The accessory 130 is shown as a litter guard 150. The accessory 130 includes a base member 154. The accessory 130 includes a base member 154. The accessory 130 includes a front flange 156. The front flange 156 projects substantially orthogonally downward relative to the base member 154. The front flange 156 includes a plurality of retention tabs 162. The retention tabs 162 have a substantially streamlined half body shape (e.g., similar to half tear drop). The accessory 130 includes a rear wall 158. A through opening 160 is formed between the base member 154 and the rear wall 158. The rear wall 158 includes rear flanges 164. The distance between the rear flange(s) 164 and the front flange 156 defines a mating gap 166.

Figure 15:
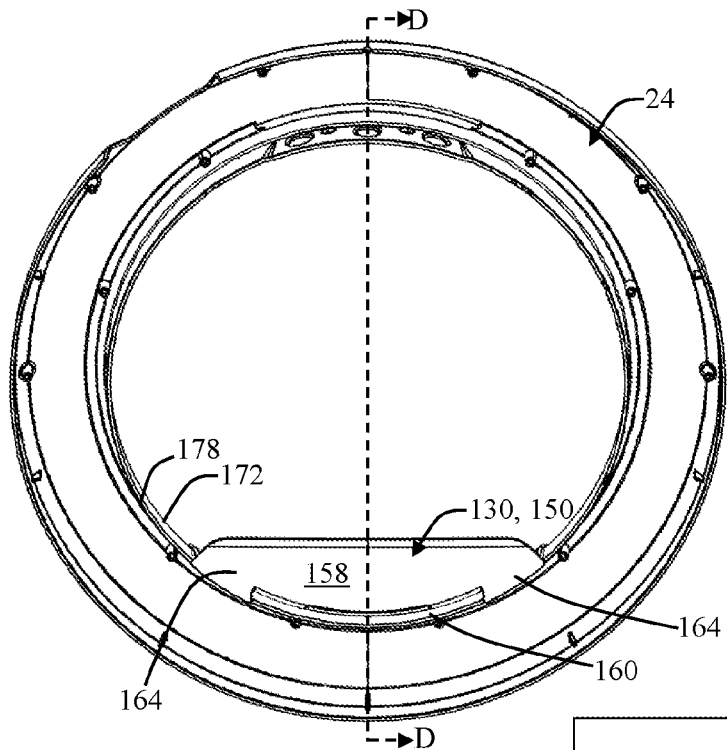
FIG. 15 is a rear view of a bezel and accessory of a litter device.

FIG. 15 illustrates a rear of a bezel 24. The bezel 24 includes an accessory 130 affixed thereon. The accessory 130 is in the form of a litter guard 150. The bezel 24 includes the inner flange 172. The accessory 130 includes a rear wall 158. The rear wall 158 includes two rear flanges 164. The rear flanges 164 abut with the edge 178 of the inner flange 172. The accessory 130 includes a through opening 160. The through opening 160 provides for an opening in the accessory 130 above the inner flange 172.

Figure 16:
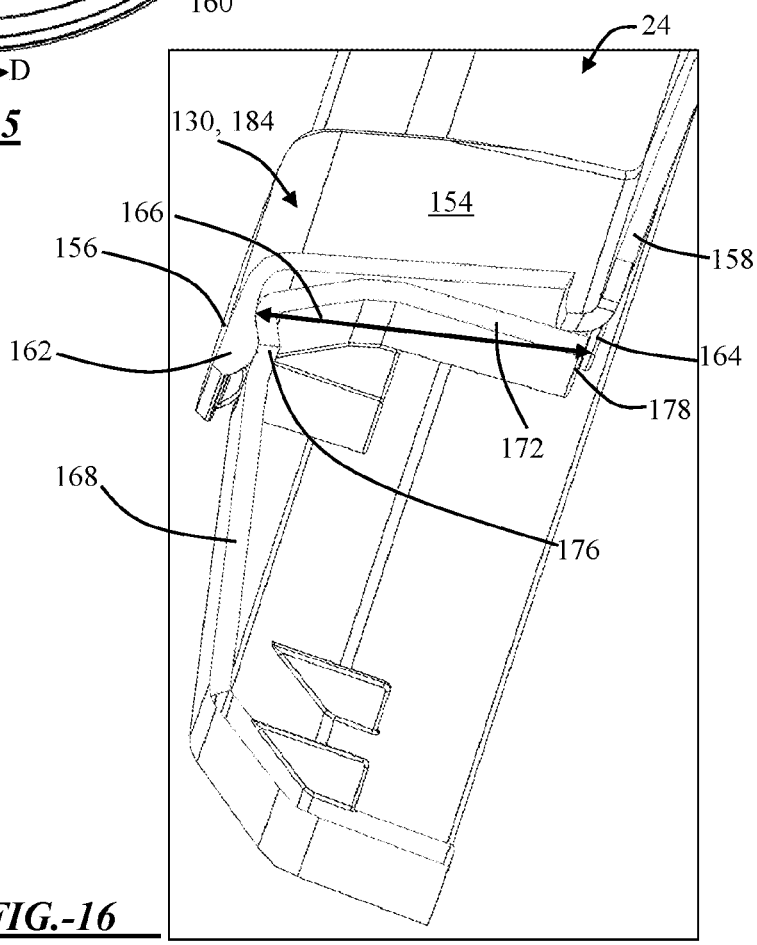
FIG. 16 is a cross-section view of a bezel and accessory along section D-D of FIG. 15.

FIG. 16 illustrates a cross-section of a portion of a bezel 24 mated to an accessory 130. The cross-section is taken along section D-D as shown in FIG. 15. The bezel 24 is located within a mating gap 166 of the accessory 130. The accessory 130 includes a base member 154. The base member 154 rests on the inner flange 172 of the bezel 24. The accessory 130 includes a front flange 156. The front flange 156 abuts with the front surface 168 of the bezel 24. The front flange 156 includes a plurality of retention tabs 162. The retention tabs 162 are disposed within a groove 176. The groove 176 is formed on the front surface 168 of the bezel 24. Opposite the front flange 156 is a rear wall 158 of the accessory 130. The wall 148 includes rear flange 164. The rear flange 164 abuts to an edge 178 of the inner flange 172.

Figure 17:
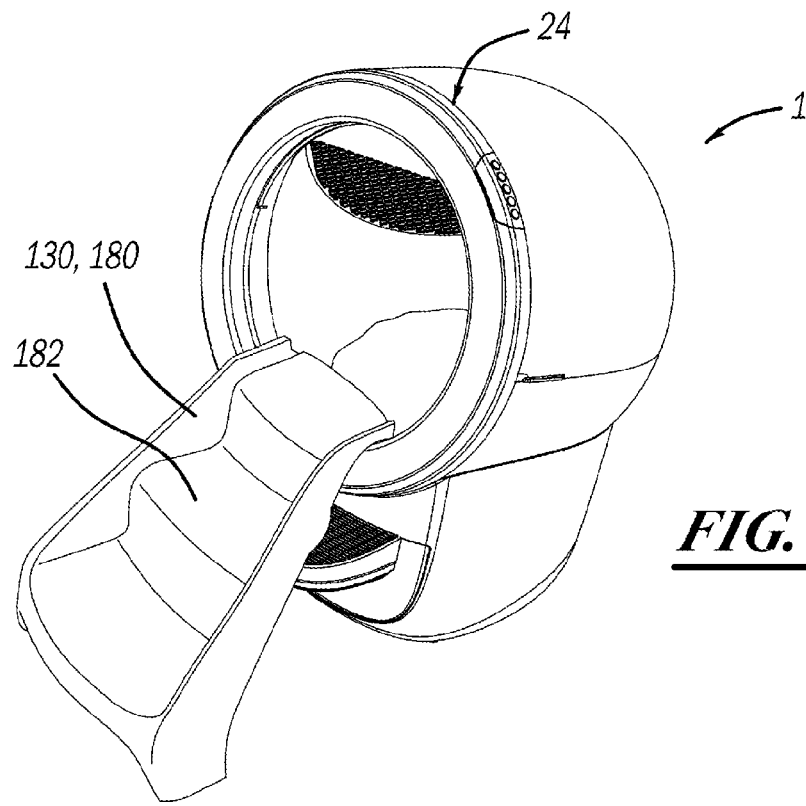
FIG. 17 is a perspective view of a litter device.
Figure 18:
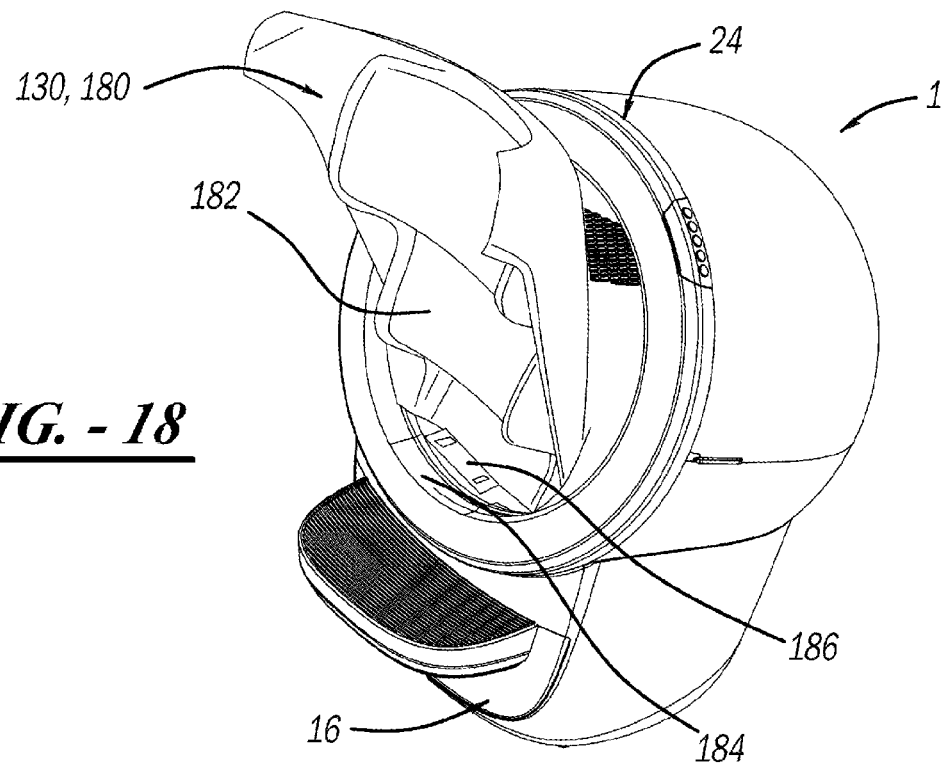
FIG. 18 is a perspective view of a litter device.
Figure 19:
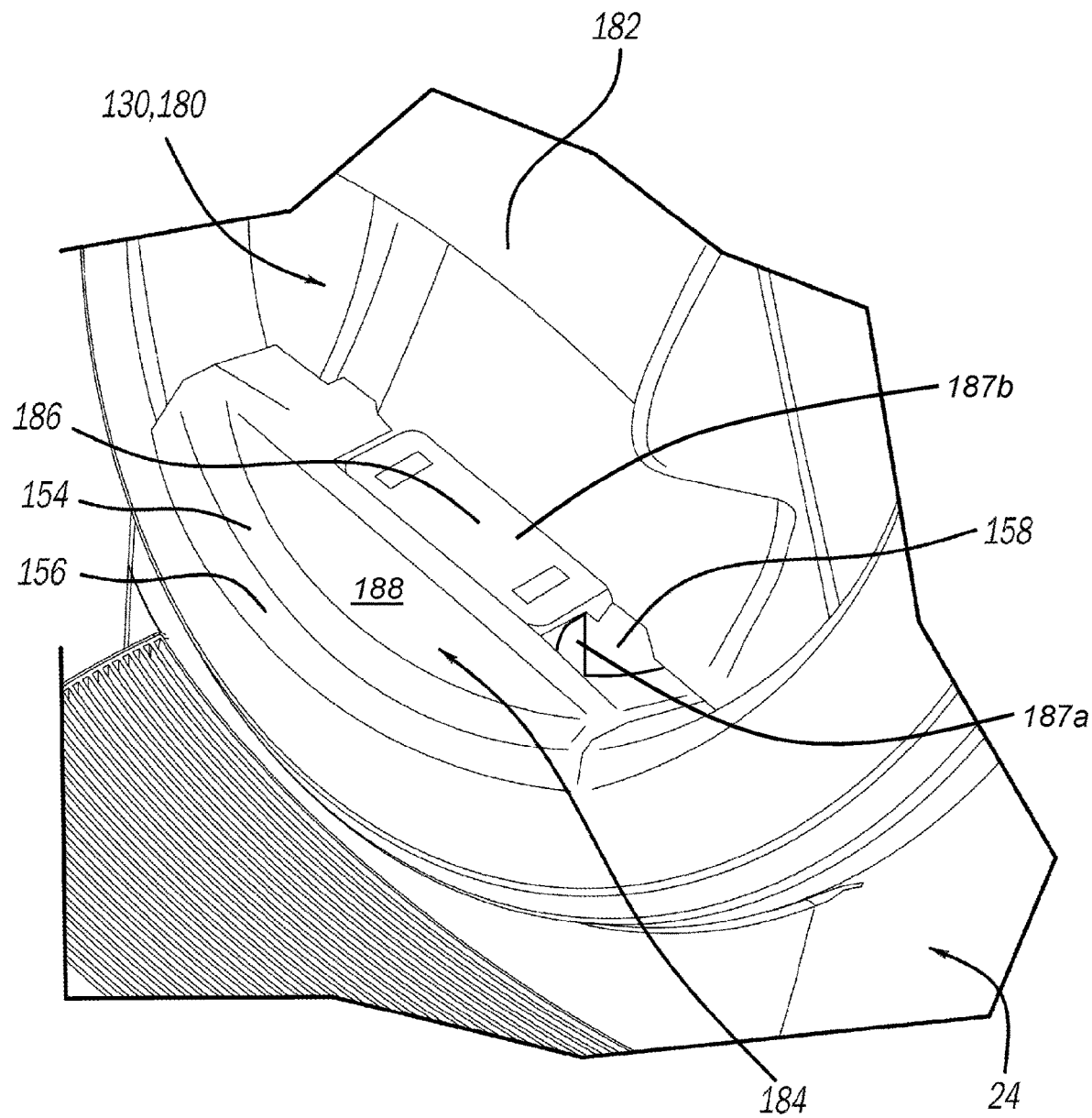
FIG. 19 is a close-up perspective view of a hinge of an accessory of a litter device.

FIGS. 17-19 illustrate a litter device 1. The litter device 1 includes a bezel 24. Affixed to the bezel 24 is an accessory 130. The accessory 130 is a step aid 180. The step aid 180 includes a plurality of steps 182. The step aid 180 includes a mounting bracket 184. The steps 182 are pivotably mounted to the mounting bracket 184 via a hinge 186. The hinge 186 includes a pintle 187a and leaf 187b. By being pivotably mounted, the steps 182 are able to be rotated upward to allow access to the waste drawer 16. The mounting bracket 184 has a substantially similar configuration as the litter guard 150. The mounting bracket 184 includes a base member 154, front flange 156, and rear wall 158. Between the rear wall 158 and front flange 156 is a hinge wall 188. The hinge wall 188 projects from the base member 154. The hinge 186 is affixed between the hinge wall 188 and the rear wall 158.

Figure 20:
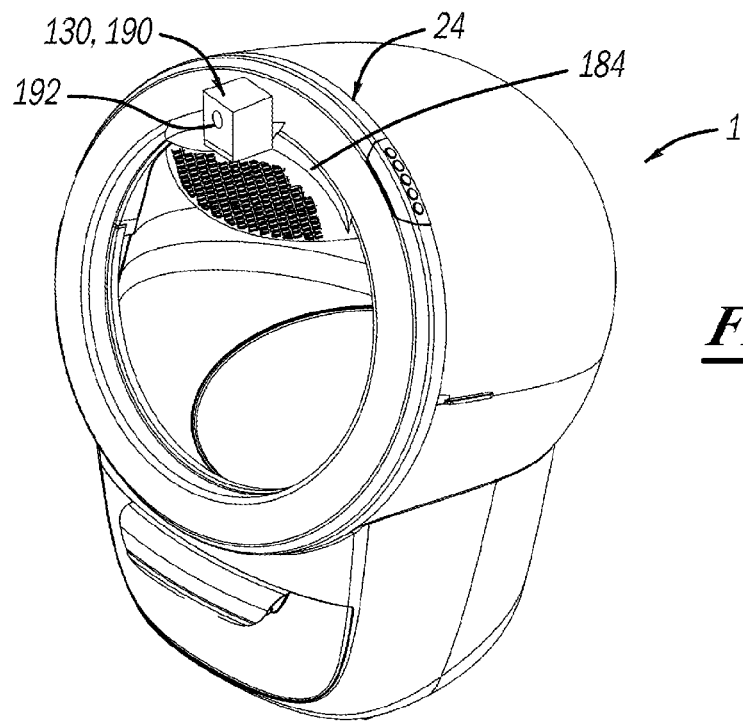
FIG. 20 is a perspective view of a litter device.
Figure 21:
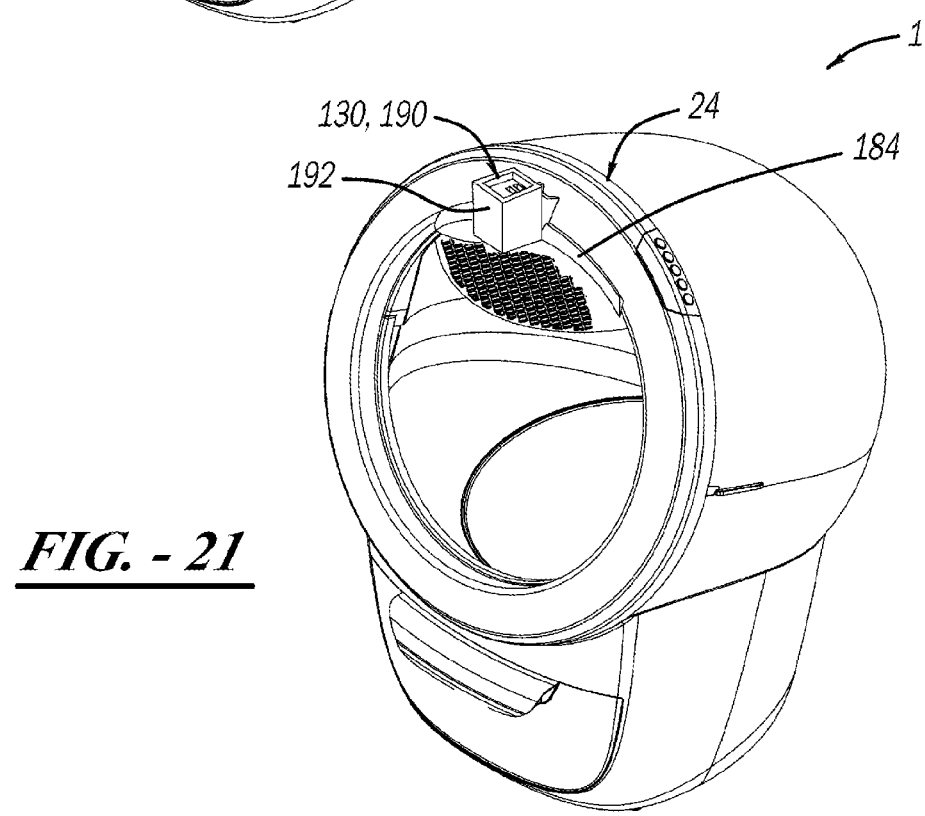
FIG. 21 is a perspective view of a litter device.

FIGS. 20 and 21 illustrate a litter device 1. The litter device 1 includes a bezel 24. Affixed to the bezel 24 is an accessory 130. The accessory 130 is a camera assembly 190. The camera assembly 190 includes a camera 192 and mounting bracket 184. The camera 192 may be pivotably mounted to the mounting bracket 184. The mounting bracket 184 may have a similar configured and be affixed to the bezel 24 such as the litter guard 150 or step aid 180.

Figure 22:
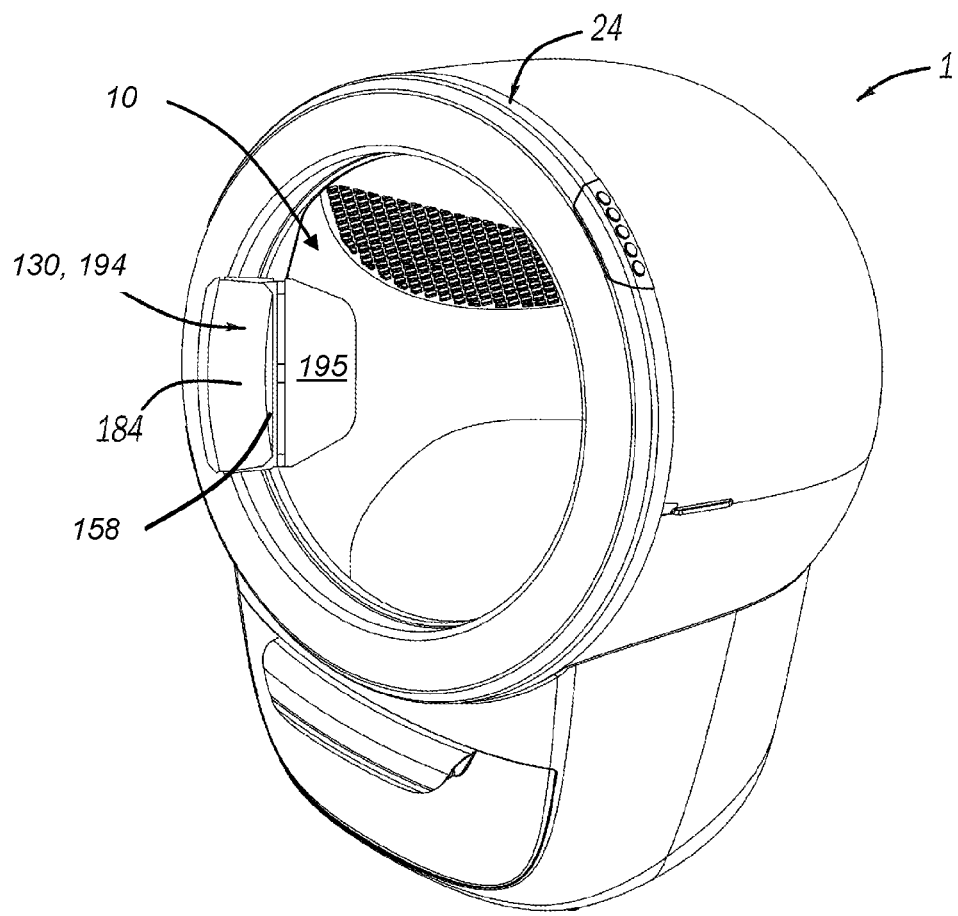
FIG. 22 is a perspective view of a litter device.

FIG. 22 illustrates a litter device 1. The litter device 1 includes a bezel 24. Affixed to the bezel 24 is an accessory 130. The accessory 130 is a scratch aid 194. The scratch aid 194 includes a mounting bracket 184. The scratch aid 194 includes a scratching portion 195. The scratching portion 195 is affixed to the mounting bracket 184 and extends inward into the chamber 10. The scratching portion 195 is affixed to the rear wall 158 of the mounting bracket 184.

FIGS. 23 and 24 illustrate a litter device 1. The litter device 1 includes a bezel 24. Affixed to the bezel 24 is a plurality of accessories 130. As shown in FIG. 23, the accessories 130 include a step aid 180, a scratch aid 194, and a camera assembly 190. As shown in FIG. 24, the accessories 130 include a litter guard 150, a scratch aid 194, and a camera assembly 190.

Figure 25:
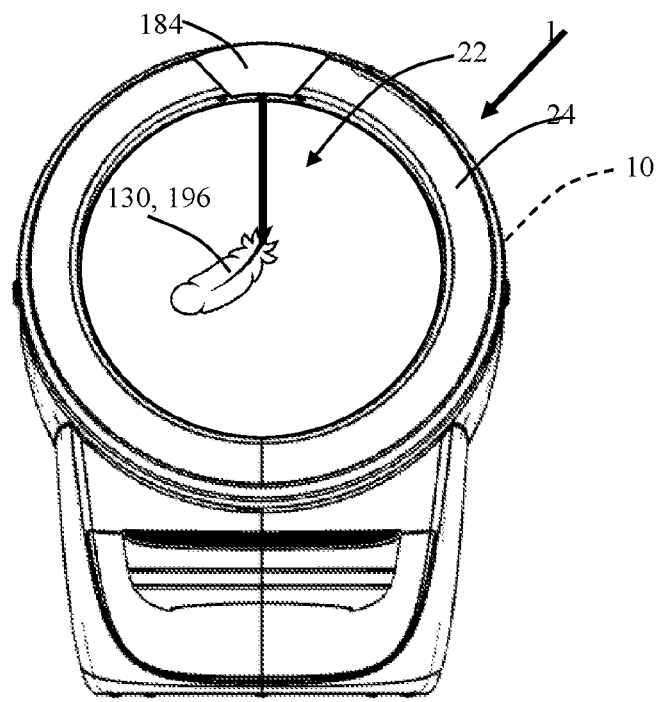
FIG. 25 is a front view of a litter device.

FIG. 25 illustrates a litter device 1. The litter device 1 includes an opening 22 framed by a bezel 24. Affixed to the bezel 24 is an accessory 130. The accessory 130 is an enticement accessory 196. The accessory 130 may include a mounting bracket 184. The enticement accessory 196 may promote an animal 300 (not shown) to fully enter the interior of the chamber 10 prior to eliminating any waste.

FIG. 26 illustrates a litter device 1. The litter device 1 includes a bezel 24 and a chamber 10. The litter device 1 includes an accessory 130. The accessory may be one or more enticement accessories 196. The enticement accessories 196 may include one or more light emitting devices 197 and/or sound emitting devices 198. The one or more enticement accessories 196 may include one or more mounting brackets 184 (not shown), may be mounted directly on the and/or in the bezel 24, and/or may be mounted within an interior of the chamber 10.

Figure 27:
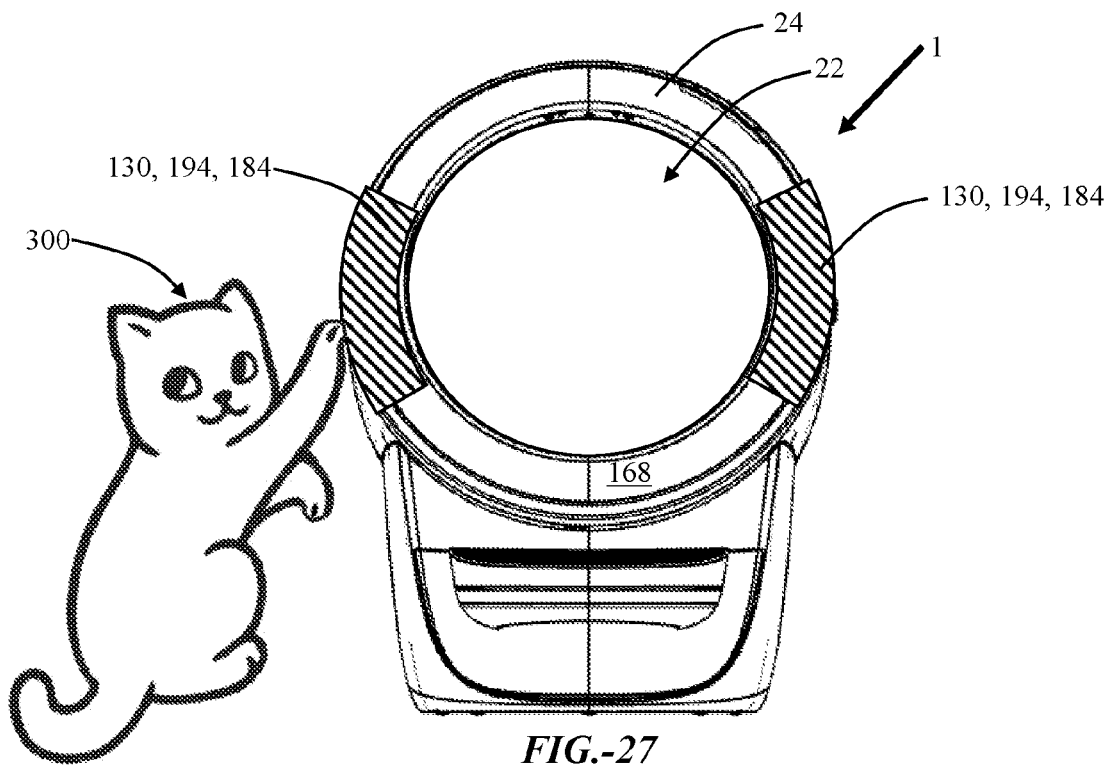
FIG. 27 is a front view of a litter device.

FIG. 27 illustrates a litter device 1. The litter device 1 includes an opening 22 framed by a bezel 24. Affixed to the bezel 24 are accessories 130. The removable accessories 130 are scratch aids 194. An animal 300 may use the accessories to stretch and/or scratch. The accessories 130 may each include a mounting bracket 184. The scratch aids 194 may be accessed by the animal 300 while located outside of the litter device 1. The scratch aids 194 may cover a portion of the front surface 168 of the bezel 24.

Figure 28:
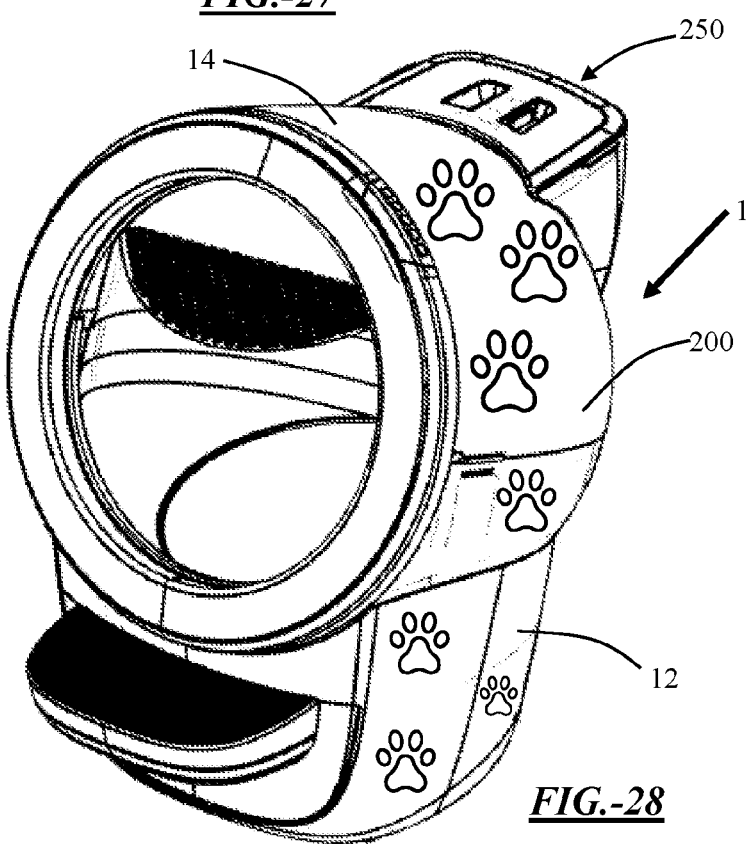
FIG. 28 is a perspective view of a litter device.

FIG. 28 illustrates a litter device 1. The litter device 1 includes a decorative covering 200. The decorative covering 200 is temporarily or permanently adhered to an exterior of the litter device 1. The covering 200 may be adhered to both a bonnet 14 and a base 12.

Figure 29:
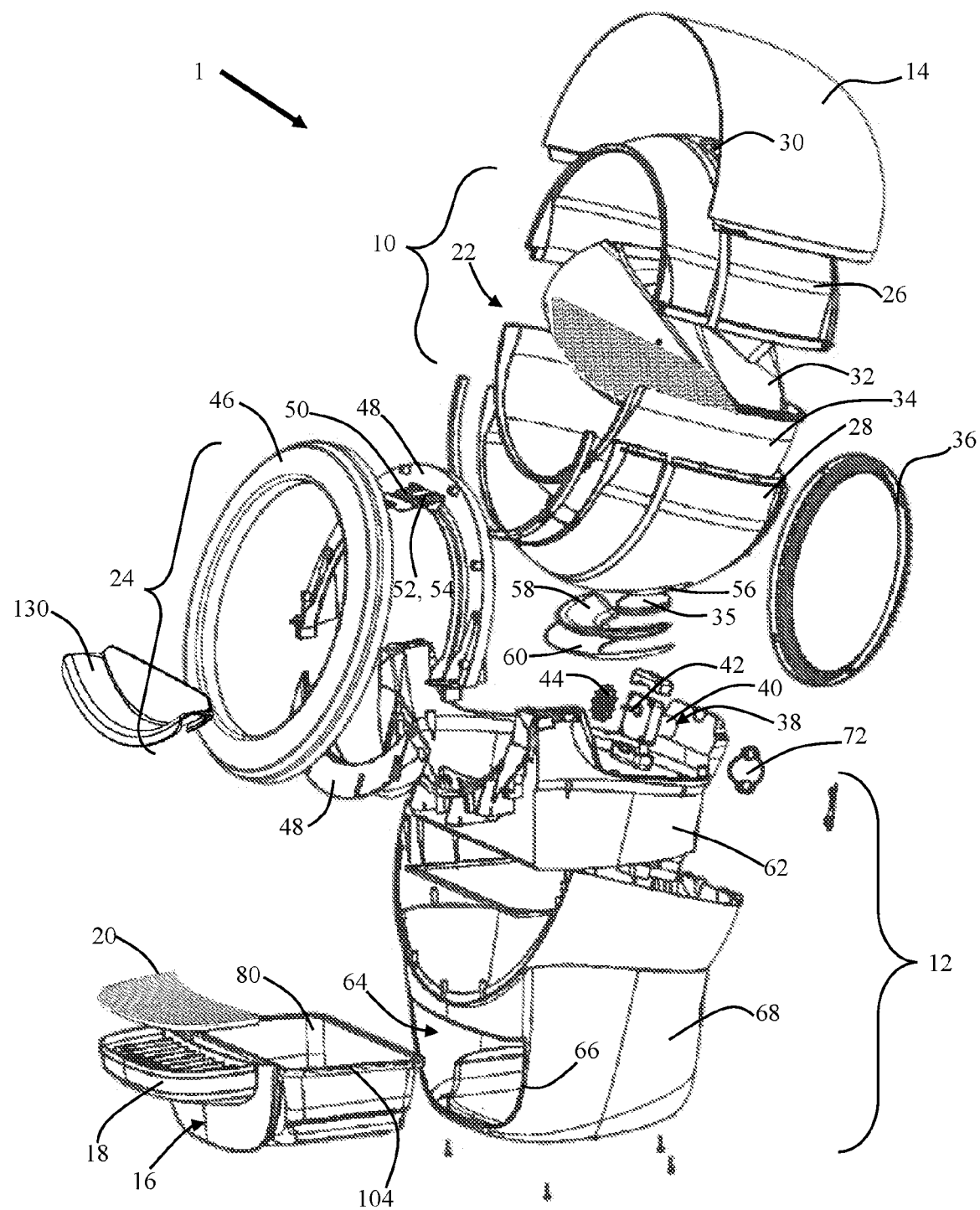
FIG. 29 is an exploded view of a litter device.

FIG. 29 is an exploded view of a litter device 1. A bonnet 14 may cover the chamber 10. The bonnet 14 may be pivotally engaged with the base 12, such as by one or more hinges (not shown). The chamber 10 comprises an upper chamber 26 and a lower chamber 28. The bonnet 14 has a shape substantially reciprocal to that of the upper chamber 26. The bonnet 14 is also solid such that it covers a waste opening 30 formed in the upper chamber 26. Located inside the chamber 10 is a septum 32. Also located inside the chamber 10 is a liner 34. The liner 34 may be flexible. The liner 34 may include a weight 35. The weight 35 may reside within an indentation (not shown) of the liner 34. The lower chamber 28 includes a filter cavity 56. The filter cavity 56 houses a removable filter 58. The filter 58 is retained within the filter cavity 56 by a filter cap 60. Affixed to the exterior of the chamber 10 is a track 36. The track 36 is located opposite the opening 22 of the chamber 10. The track 36 is in the form of a ring gear having the gear teeth formed about a periphery. The track 36 is rotationally engaged with a drive source 38. The drive source 38 is a motor 40 with a drive shaft 42 rotationally engaged with a gear 44. The gear 44 meshes with the track 36 so that rotation from the drive source 38 is transferred to the track 36. The track 36 is statically affixed to the chamber 10. Thus, rotation of the track 36 results in rotation of the chamber 10. Located about the opening 22 is a bezel 24. The bezel 24 is affixed to the base 12 and to the bonnet 14. The bezel 24 includes an outer bezel 46 and inner bezel 48. The outer bezel 46 is affixed to and covers the inner bezel 48. The bezel 24 includes a sensor board 50. The sensor board 50 is mounted onto the inner bezel 48 and located between the outer bezel 46 and inner bezel 48. The sensor board 50 is mounted such that it is opposite relative to the base 12, including the waste drawer 16 (e.g., upper portion of bezel and device 1 as opposed to lower). The sensor board 50 includes one or more sensors 52. The base 12 includes a chamber support 62 and base frame 68. The chamber support 62 rests within the base frame 68. The chamber support 62 houses the drive source 38. The chamber support 62 separates the waste drawer 16 from the chamber 10. The chamber support 62 aids in forming a drawer cavity 64. The waste drawer 16 resides within the drawer cavity 64. The waste drawer 16 is movable in and out of the drawer cavity 64 via a drawer opening 66 in the base 12. The waste drawer 16 includes a step 18. The step 18 may be able to be used as a handle. The step 18 includes a cleaning device 20. The waste drawer 16 includes a waste bin 80. The waste drawer 16 also includes a seal 104. The seal 104 may be located about a periphery of a waste bin 80. The periphery may be defined by a rim or flange. The base 12 may include one or more port caps 72.

Figure 30:
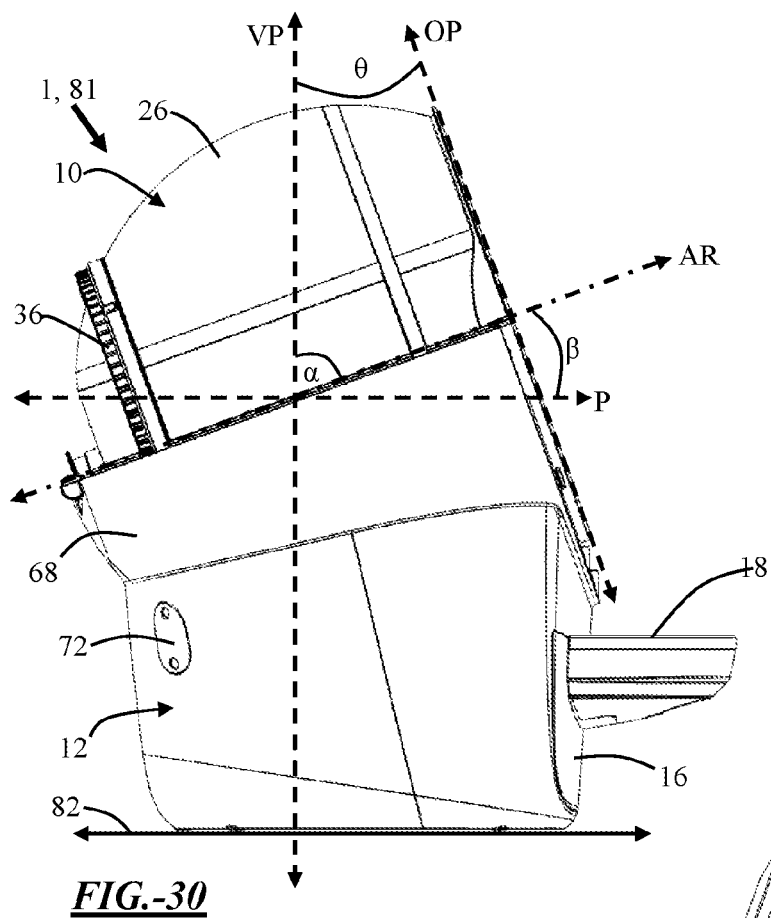
FIG. 30 is a left side view of a litter device with a bonnet removed.
Figure 31:
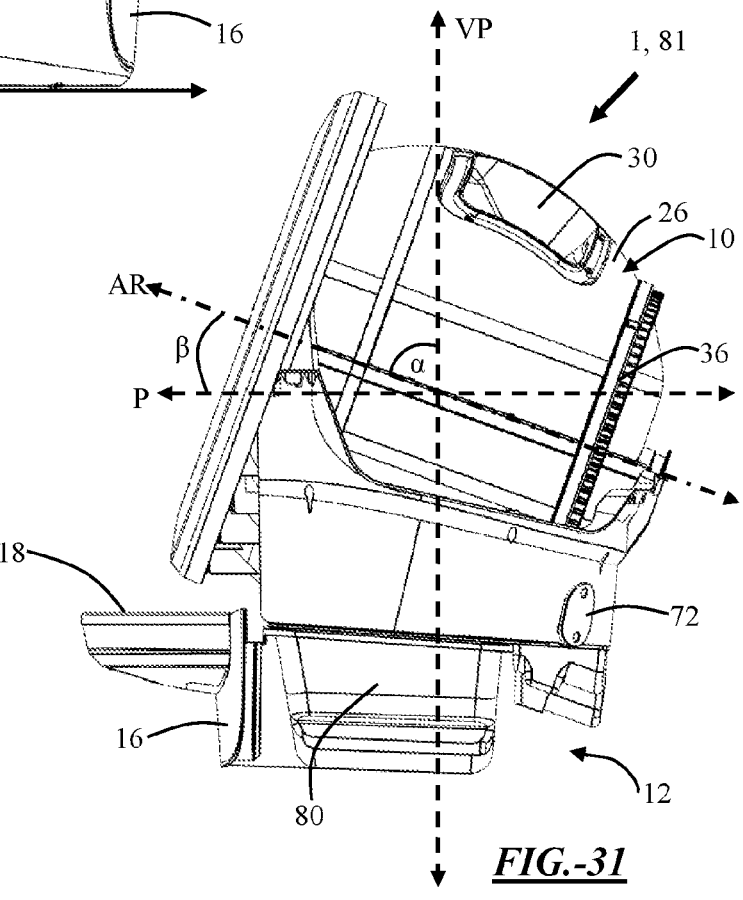
FIG. 31 is a right side view of a litter device with a bonnet and base frame removed.

FIG. 30 illustrates a litter device 1 without a bonnet 14, while FIG. 31 also has the base frame 68 removed. The device 1 includes a chamber 10. While in a home position 81, an upper chamber 26 is located above the base 12. The base 12 includes one or more port caps 72. The base 12 also includes a waste drawer 16 with a step 18. The waste drawer 16 includes a waste bin 80. The waste bin 80 is located under the chamber 10. When the chamber 10 rotates during a cleaning cycle, the waste opening 30 is aligned with the waste bin 80 allowing waste to be transferred from chamber 10 to the waste drawer 16. A cleaning cycle results in rotation of the chamber 10. Rotation of the chamber 10 results from rotation of the track 36. The track 36 is statically affixed to the chamber 10 so that rotation of the track 36 results in rotation of the chamber 10. The chamber 10 rotates about an axis of rotation AR. The axis of rotation AR forms an angle α with vertical which is represented by a vertical plane VP. The axis of rotation AR forms an angle β with a plane P parallel to a surface 82. The surface 82 is one which the device 1 rests upon, such as a floor. The opening 22 extends along an opening plane OP. The opening plane OP forms an angle Θ with the vertical plane VP.

Figure 32A:
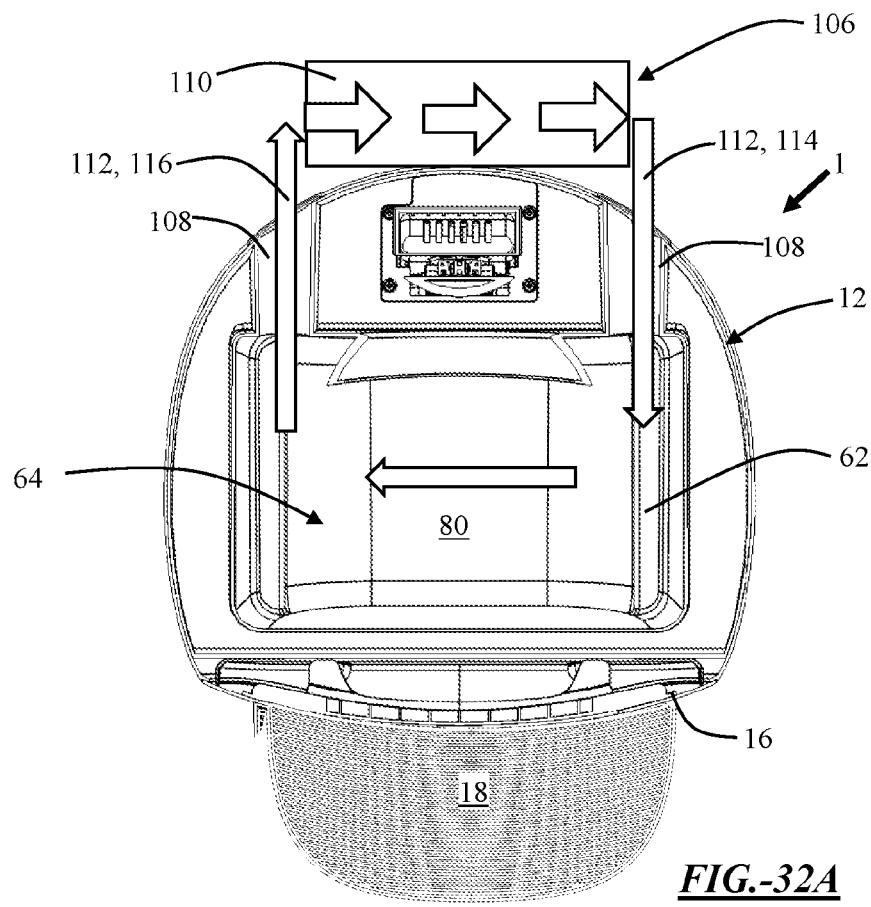
FIG. 32A illustrates an interior of a base of a litter device.
Figure 32B:
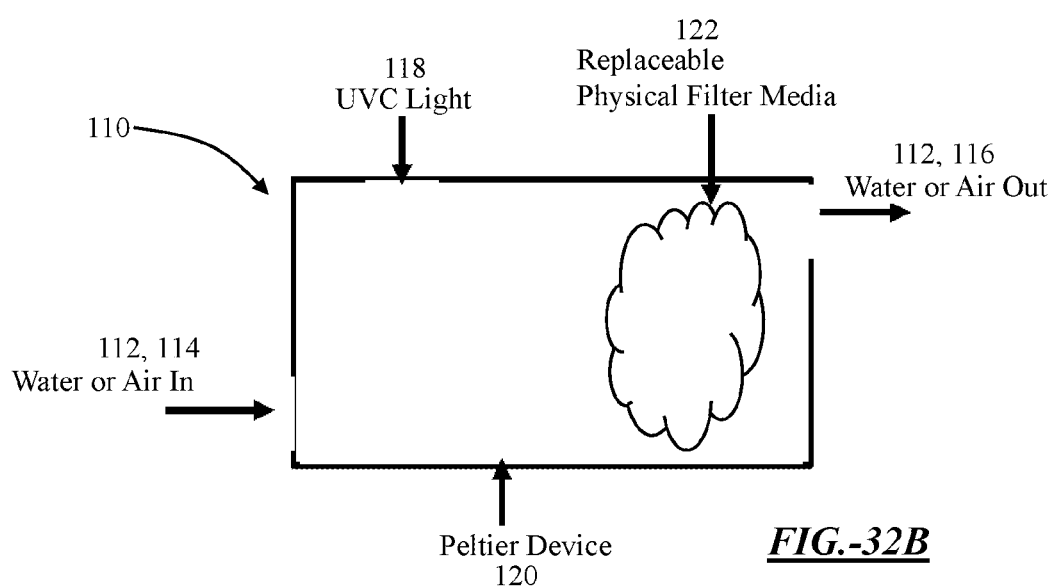
FIG. 32B illustrates a filter system of a litter device such as shown in FIG. 23A.

FIGS. 32A and 32B illustrate a ventilation system 106 useful with the device 1. The ventilation system 106 includes a plurality of ducts 112. The ducts 112 are connected to the ports 108. Via the ports 108, the ducts 112 are in fluid communication with the waste bin 80. The ducts 112 provide for an inflow 114 and outflow 116. The outflow 116 pulls air from the waste bin 80 while the inflow 114 pushes air from a filtering system 110 into the waste bin 80. The filtering system 110 may be an active system (e.g., moves air). The filtering system 110 may move air via one or more fans (not shown) to provide for air circulation. The filtering system 110 may include one or more fans, filters, lights, heat exchange devices, and/or the like which are capable of reducing, neutralizing, or even eliminating odor, such as odor related to animal waste (e.g., urine, feces). The reduction of odor may occur through eliminating bacteria causing the odor, filtering the odor, and/or even cooling the air to reduce the odor.

One exemplary filtering system may be that as shown in FIG. 32B. The filtering system 110 may include a connection to an outflow 116, such that outgoing air from the waste bin 80 is routed into the filtering system. The filtering system 110 may include a connection to an inflow 114, such that incoming air from to the waste bin 80 is air that has been treated by the filtering system 110. The filtering system 110 may include one or more light treatment devices 118. The one or more light treatment devices 118 may be any energy source suitable for killing bacteria waste which causes a malodor. For example, the one or more light treatment devices 118 may include one or more ultraviolet lights. The filtering system 110 may include one or more thermoelectric devices 120. The one or more thermoelectric devices 120 may be any device suitable for cooling the air passing through the filtering system 110. By cooling the air, growth of bacteria in waste which causes malodors may be suppressed, thus helping prevent odor. The one or more thermoelectric devices 120 may include one or more Peltier devices. The filtering system 110 may include one or more physical filters 122. The one or more physical filters 122 may be any filter suitable for absorbing odor from air as the air passes through the filter. One or more physical filters 122 may include zeolite, charcoal, nylon wool, synthetic wool, silica gel, baking powder, the like, or a combination thereof. The filtering system 110 may have one, two, or all three of: the light treatment device 118, thermoelectric device 120, and physical filter 122.

Figure 33:
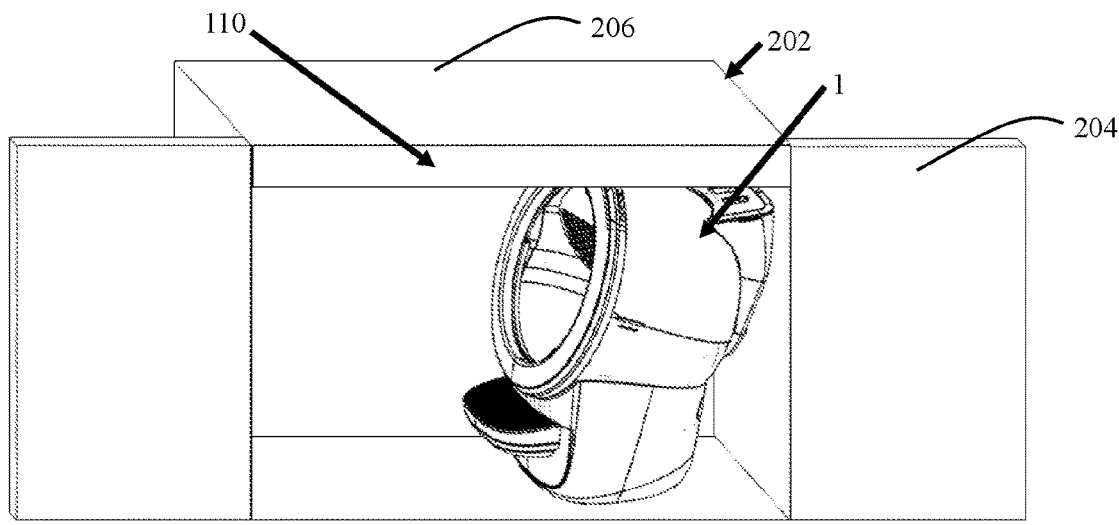
FIG. 33 illustrates a filter system of a litter device.
Figure 34:
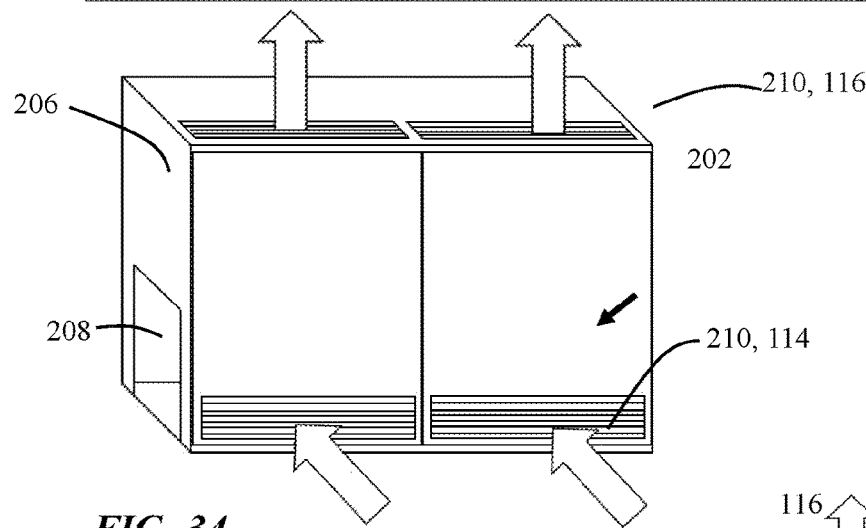
FIG. 34 illustrates a filter system of a litter device.
Figure 35:
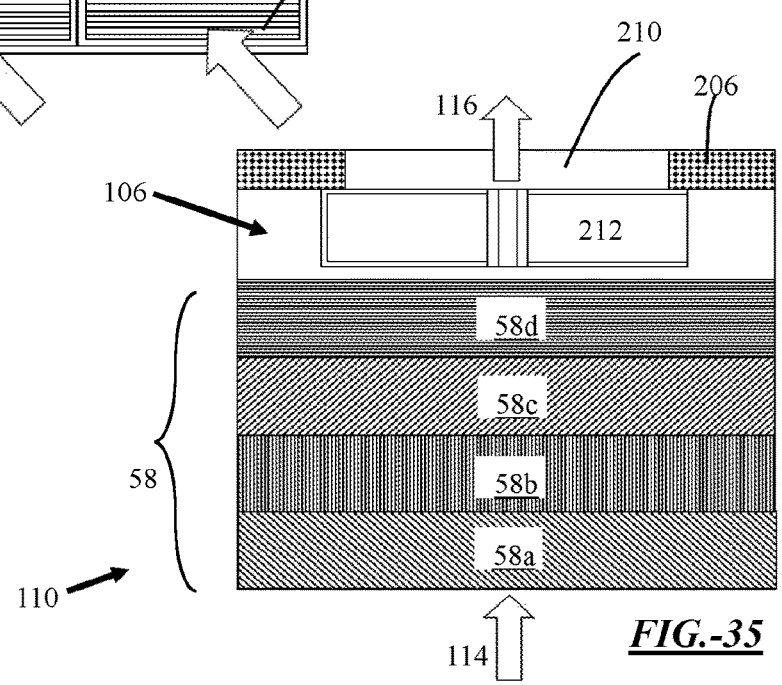
FIG. 35 illustrates a filter system of a litter device.

FIGS. 33-35 illustrates an exterior storage unit 202 configured to retain and conceal the litter device 1. The exterior storage unit 202 includes doors 204 and walls 206. Formed in one wall 206 is an entry 208. The entry 208 may allow for an animal 300 (not shown) to enter into the exterior storage unit 202 and use the litter device 1. The exterior storage unit 202 includes a filtering system 110. The exterior storage unit 202 may include a plurality of vents 210. The vents 210 may provide for an inflow 114 of ambient air and an outflow 116 into the ambient air.

FIG. 35 illustrates a filtering system 110. The filtering system 110 is adjacent to a wall 206 of an exterior storage unit 202. The filtering system 110 is in fluid communication with a vent 210. The filtering system 110 includes a filter 58. The filter 58 includes a pre-filter 58a, allergen filter 58b, deodorization filter 58c, and pathogen filter 58d. The filtering system 110 includes a ventilation system 106. The ventilation system 106 includes an air circulation device 212 (e.g., fan). The air circulation device 212 creates an airflow through the filtering system 110. The air circulation device 212 draws air into the filter 58 for filtering via an inflow 114. The air circulation device 212 expels the filtered air via an outflow 116.

FIG. 36 illustrates an accessory 130 mounted to a bezel 24. The accessory 130 includes an odor neutralizing system 214. The odor neutralizing system 214 includes a mounting bracket 184. The odor neutralizing system 214 may emit a spray 216.

FIG. 37 illustrates a perspective view of a chamber 10. The chamber 10 includes an upper chamber 26 opposing and affixed to a lower chamber 28. The upper chamber 26 includes a waste opening 30. The lower chamber 28 includes a filter cavity 56 suitable for housing a filter 58. A filter cap 60 retains the filter 58 within the filter cavity 56.

FIG. 38 illustrates a filtering system 110. The filtering system 110 may be a passive system (e.g., absorbs odors from ambient air). The filtering system 110 may include a filter 58. The filter 58 has an arcuate contour reciprocal with a contour of a chamber 10 (such as illustrated in FIG. 37). The filter 58 may include one or more physical filters 122 (not shown). For example, the physical filter 122 may include zeolite, charcoal, nylon, wool, synthetic wool, silica gel, baking soda, the like, or a combination thereof.

FIG. 39 illustrates a device 1 having a filtering system 110. The filtering system 110 is integrated into the chamber 10. The filtering system 110 resides adjacent to the waste bin 80. The filtering system 110 may be able to absorb odors and filter air which rise from waste located within a waste bin 80. The filtering system 110 may include one or more physical filters 122. The filtering system 110 may be the filtering system 110 described with respect to FIGS. 37 and 38.

REFERENCE LISTING

1—Device, 5—Litter, 10—Chamber, 12—Base, 14—Bonnet, 16—Waste drawer, 18—Step, 20—Cleaning device, 22—Opening, 24—Bezel, 26—Upper chamber, 28—Lower chamber, 30—Waste opening, 32—Septum, 34—Liner, 35—Weight, 36—Track, 38—Drive source, 46—Outer bezel, 48—Inner bezel, 50—Sensor board, 52—Sensor(s), 56—Filter cavity, 58—Filter, 58a—Pre-filter, 58b—Allergen filter, 58c—Deodorization filter, 58d—Pathogen filter, 60—Filter cap, 62—Chamber support, 64—Drawer cavity, 66—Drawer opening, 68—Base frame, 72—Port cap(s), 80—Waste bin, 81—Home position, 104—Seal, 106—Ventilation System, 108—Port(s), 110—Filtering system, 112—Duct(s), 114—Inflow, 116—Outflow, 118—Light treatment device, 120—Thermoelectric device, 122—Physical filter, 130—Accessory, 150—Litter guard, 152—Grooming portion, 154—Base member, 156—Front flange, 156a—Front surface of front flange, 156b—Rear surface of front flange, 158—Wall, 160—Through opening, 162—Retention tab, 164—Rear flange, 166—Mating gap, 168—Front surface of bezel, 170—Outer flange of bezel, 172—Inner flange of bezel, 174—Bevel, 176—Groove, 178—Edge of inner flange, 180—Step aid, 182—Plurality of steps, 184—Mounting bracket, 186—Hinge, 187a—Pintle, 187b—Leaf, 188—Hinge wall, 190—Camera assembly, 192—Camera, 194—Scratch aid, 196—Enticement accessory, 197—Light emitting device, 198—Sound emitting devices, 200—Decorative covering, 202—Exterior storage unit, 204—Doors, 206—Walls, 208—Entry, 210—Vent(s), 212—Air circulation device, 214—Odor neutralizing system, 216—Spray, 250—Litter dispenser, 300—Animal, AR—Axis of rotation, OP—Opening Plane, P—Plane, VP—Vertical Plane, α—Angle, β—Angle, Θ—Angle Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one"

to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A litter device having:
   a) a base
   b) a chamber with an entry opening, wherein the chamber is configured to retain litter and is rotatably supported by the base;
   c) a bezel located about the entry opening, wherein the bezel includes a front surface and one or more mating features, and wherein the front surface is an outside surface of the bezel; and
   d) one or more accessories removably affixed to the bezel, wherein the one or more accessories cover a portion of the front surface of the bezel, wherein the one or more accessories include a mounting bracket, and wherein the mounting bracket includes one or more mating features which engage with the one or more mating features of the bezel such that the mounting bracket is removably affixed to the bezel, and
   wherein the one or more mating features of the bezel includes a groove; and wherein the groove at least partially encircles about the entry opening.

2. The litter device of claim 1, wherein the entry opening has a cross-section which is substantially circular, ovular, elliptical, square, rectangular, or any combination thereof, and
   wherein the bezel has a shape which is similar to and/or reciprocal with a shape of the entry opening.

3. The litter device of claim 1, wherein the bezel has a shape which is substantially annular.

4. The litter device of claim 1, wherein the one or more accessories include one or more litter guards, grooming portions, step aids, camera assemblies, scratch aids, enticement accessories, odor neutralizing systems, or any combination thereof.

5. The litter device of claim 1, wherein the mounting bracket has a shape which is at least partially reciprocal with a shape of the bezel.

6. The litter device of claim 1, wherein the groove is adjacent to an inner periphery and/or an inner flange of the bezel.

7. The litter device of claim 1, wherein the one or more mating features of the mounting bracket include one or more retention tabs.

8. The litter device of claim 1, wherein the mounting bracket includes a base member configured to rest upon an inner peripheral surface of the bezel.

9. The litter device of claim 8, wherein the inner peripheral surface of the bezel is an inner flange of the bezel.

10. The litter device of claim 8, wherein the mounting bracket includes one or more front flanges.

11. The litter device of claim 10, wherein the one or more front flanges are integral with and project from the base member.

12. The litter device of claim 10, wherein the one or more front flanges abut with the front surface of the bezel.

13. The litter device of claim 8, wherein the mounting bracket includes one or more rear flanges.

14. The litter device of claim 13, wherein the one or more rear flanges are integral with and project from the base member.

15. The litter device of claim 13, wherein the one or more rear flanges abut with one or more flanges of the bezel.

16. The litter device of claim 8, wherein the mounting bracket includes one or more walls which are integral with and project from the base member; and
   wherein the one or more walls project in a generally opposite direction from the base member as one or more flanges.

17. The litter device of claim 16, wherein the one or more walls include one or more rear walls, hinge walls, or both.

18. The litter device of claim 1, wherein the mounting bracket includes one or more hinges.

19. The litter device of claim 18, wherein the one or more hinges are affixed to and/or part of at least one of the one or more accessories.

20. The litter device of claim 19, wherein at least part of the one or more accessories are rotatable about a portion of the one or more hinges, the mounting bracket, or both.

21. The litter device of claim 19, wherein the one or more accessories include one or more step aids; and
   wherein the one or more step aids include a ramped portion which includes a plurality of steps, a ramp, or both.

22. The litter device of claim 8, wherein the mounting bracket has an interference fit, snap fit, or both with the bezel.

23. The litter device of claim 1, wherein the one or more accessories include one or more grooming portions; and
   wherein the one or more grooming portions include one or more teeth, spikes, bristles, fur attracting material or any combination thereof.

* * * * *